United States Patent [19]

Takatori et al.

[11] Patent Number: 5,602,611
[45] Date of Patent: Feb. 11, 1997

[54] PHOTOGRAPHIC FILM CASSETTE

[75] Inventors: Tetsuya Takatori; Akimasa Kaya, both of Kanagawa, Japan

[73] Assignee: Fuji Photo Film Co., Ltd., Kanagawa, Japan

[21] Appl. No.: 114,616

[22] Filed: Sep. 1, 1993

[30] Foreign Application Priority Data

Sep. 1, 1992 [JP] Japan ................................ 4-276495

[51] Int. Cl.$^6$ ................................................ G03B 17/26
[52] U.S. Cl. ........................ 396/513; 396/515; 396/516
[58] Field of Search ..................................... 354/275, 277

[56] References Cited

U.S. PATENT DOCUMENTS

| | | | |
|---|---|---|---|
| 4,832,275 | 5/1989 | Robertson | 242/71.1 |
| 4,834,306 | 5/1989 | Robertson et al. | 242/71.1 |
| 4,965,600 | 10/1990 | Smart et al. | 354/212 |
| 4,994,828 | 2/1991 | Smart | 354/21 |
| 5,200,777 | 4/1993 | Zander | 354/275 |
| 5,213,277 | 5/1993 | Takahashi et al. | 242/71.1 |
| 5,234,174 | 8/1993 | Pagano et al. | 354/275 |
| 5,319,407 | 6/1994 | DiRisio | 354/275 |

FOREIGN PATENT DOCUMENTS

| | | | |
|---|---|---|---|
| 0406815 | 1/1991 | European Pat. Off. | G03B 17/30 |
| WO9004201 | 4/1990 | WIPO | G03B 17/24 |
| WO9004202 | 4/1990 | WIPO | G03B 17/24 |

Primary Examiner—David M. Gray
Attorney, Agent, or Firm—Sughrue, Mion, Zinn, Macpeak & Seas

[57] ABSTRACT

A photographic film cassette has a rotatable spool on which photographic film is wound. A leader of the photographic film is advanced outward through a passage port by rotation of the spool in an unwinding direction. A shutter rod is arranged in the passage port, and is rotated between closed and open positions. When assuming the closed position, the shutter rod blocks the passage port to shield the ambient light. When the shutter rod assumes the open position, the photographic film is allowed to pass. An externally operable locking lever regulates rotation of the shutter rod, and is swingable with resilience between a locking position, where the shutter rod is locked in the closed position, and an unlocking position, where the shutter rod is unlocked. When the spool is rotated, the lever rotates the shutter rod to the open position. An exposure status indicating device is arranged on an end face of a cassette shell, and has a pointer, which points a plurality of indicative areas and indicates the present status of the photographic film.

37 Claims, 38 Drawing Sheets

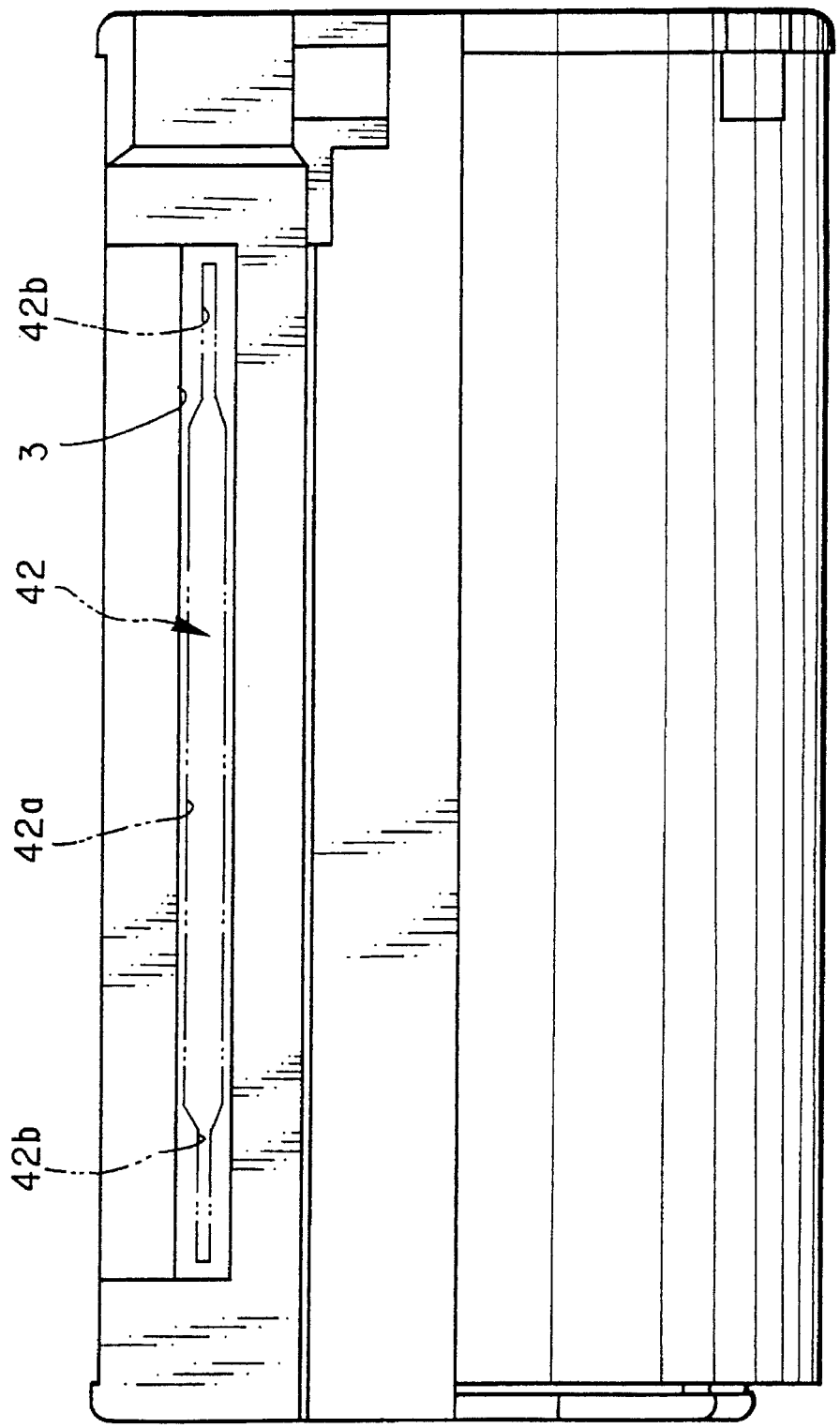

PHOTOGRAPHIC FILM CASSETTE

BACKGROUND OF THE INVENTION

1. Field of the Invention

The present invention relates to a photographic film cassette. More particularly, the present invention relates to a photographic film cassette in which a leader of photographic film is entirely contained in a cassette shell prior to use, and rotation of a spool causes the leader to advance to the outside of the cassette shell.

2. Description of the Related Art

In a conventional photographic film cassette containing 135 photographic film, a photographic film leader protrudes to the outside of a cassette shell even before use of the photographic film. To load a camera with such a cassette, a user is required to pay attention the cassette shell as well as the protruded leader. It has been proposed to construct a cassette in which not only a roll of film but also a leader thereof is contained in a cassette shell, and rotation of a spool causes the leader to advance to the outside of the cassette shell, as disclosed in U.S. Pat. Nos. 4,832,275 and 4,834,306 and a commonly assigned U.S. Pat. No. 5,213,277. It is also known, as disclosed in a commonly assigned European Patent Publication NO. EP-A2 0 406 815, to use an openable cover member for preventing light from entering the inside of the cassette shell through a passage port for the photographic film.

Presently, external apparatuses for use with the photographic film, such as a photographic film processor, a photographic film video player, are adapted to loading with the entirety of the photographic film being contained in the cassette. It is conceivable to load a wrong apparatus with the cassette, e.g., load the video player with a cassette containing unexposed photographic film, or load the processor with a cassette containing the developed photographic film. Therefore, when a cassette contains the photographic film of any status, e.g., unexposed, exposed and developed, prevention of errors during handling is a problem, because the status of the photographic film cannot be recognized externally.

U.S. Pat. No. 4,965,600, in view of such a situation, discloses a photographic film cassette, and a camera for use with the same, in which a status of photographic film in the cassette is indicated externally as one of being Completely Unexposed, Partly Exposed or Completely Exposed.

The openable cover member disclosed in European Patent Publication No. EP-A2 0 406 815, does not reliably provide protection against ambient light. Such an openable cover member is supported on the cassette shell via a hinged structure, and thus the cover member could be accidentally opened when subjected to shock or vibration even to a small extent, e.g., in the course of use or transportation.

The construction in U.S. Pat. No. 4,965,600 also has a problem in that the camera to be used with the cassette must incorporate a complicated arrangement inclusive of a device for opening/closing the cover member, a device for driving the indication for the status of the photographic film, a device for driving the spool, and a double exposure preventive device for avoiding loading of the cassette which contains the exposed photographic film. This does not render it useful with a compact camera because the relevant devices require a sufficiently large dimension of the camera. Also, the devices are expensive to manufacture.

SUMMARY OF THE INVENTION

In view of the foregoing problems, an object of the present invention is to provide a photographic film cassette of a leader-advancing type in which photographic film is reliably protected from ambient light, even in the course of use or transportation.

Another object of the present invention is to provide a photographic film cassette of a leader-advancing type, for use with which a camera can have a simplified construction.

A further object of the present invention is to provide a photographic film cassette of a leader-advancing type which does not require high precision in forming shell parts to prevent ambient light from entering the cassette shell through a joining line between the shell parts.

Still another object of the present invention is to provide a photographic film cassette of a leader-advancing type in which visible information relating to the state of photographic film in the cassette can be readily recognized.

In order to achieve the above and other objects and advantages of this invention, a shutter member is arranged in the passage port to be displaced between closed and open positions. When assuming the closed position, the shutter member blocks the passage port to prevent the ambient light from entering the roll chamber, and when assuming the open position, the shutter member allows the photographic film to pass through the passage port. A locking device is displaceable between a locking position, where the shutter member is locked in the closed position, and an unlocking position, where the shutter member is unlocked. Further, an opener device displaces the shutter member to the open position when the spool is rotated. The photographic film is thus reliably protected from ambient light even in the course of use or transportation. Also, a camera for use with the novel cassette can have a simplified construction.

The cassette shell is constituted of two shell halves molded from resin, and the joining edges of the shell halves, which are passed through end faces of the cassette shell, are substantially straight. The plane construction of the joining line is favorable for facilitating molding of the respective shell halves. The shell joining step as a cassette producing step can be performed without high precision, while still preventing ambient light from entering the cassette shell through the joining line between the shell halves.

A device is arranged on a first end face of the cassette shell for indicating a status of exposure of the photographic film. This device has a pointer member and a plurality of indicative areas for being pointed to by the pointer member to indicate the status. A rotary plate is arranged on the spool at an axial end to appear on an end face of the cassette shell. The pointer member is arranged on the rotary plate. The status of the photographic film in the cassette can thus be readily recognized.

BRIEF DESCRIPTION OF THE DRAWINGS

The above objects and advantages of the present invention will become more apparent from the following detailed description when read in connection with the accompanying drawings, in which:

FIG. 11 is a front elevation of the cassette of FIG. 1;

DETAILED DESCRIPTION OF THE PREFERRED EMBODIMENTS OF THE PRESENT INVENTION

Figure 1:
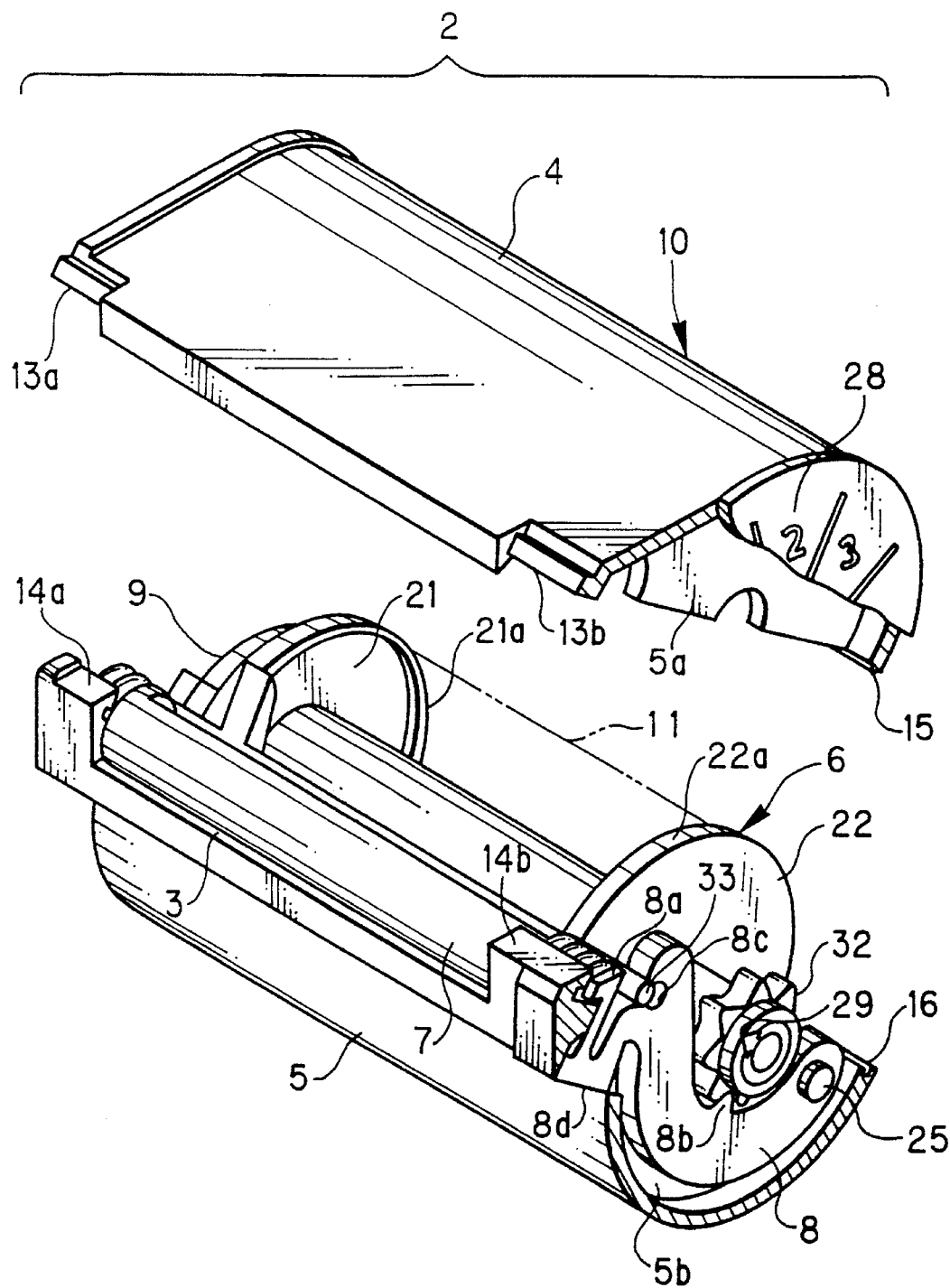
FIG. 1 is an exploded perspective view illustrating a photographic film cassette of a preferred embodiment.

In FIG. 1 illustrating a first embodiment of the present invention, a photographic film cassette 2 has upper and lower shell halves 4 and 5, between which a passage port 3 for photographic film is formed. The shell halves 4 and 5 constitute a cassette shell 10, in which a spool 6 is rotatably contained. Inside the passage port 3 is arranged a shutter rod 7 for opening and closing the passage port 3. A locking lever 8, to be described later in detail, is adapted both to latching the spool 6 relative to the cassette shell 10 and to rotating the shutter rod 7. The cassette shell 10 also covers a signaling rotary disk 9 for indicating the rotational position of the spool 6.

Figure 2:
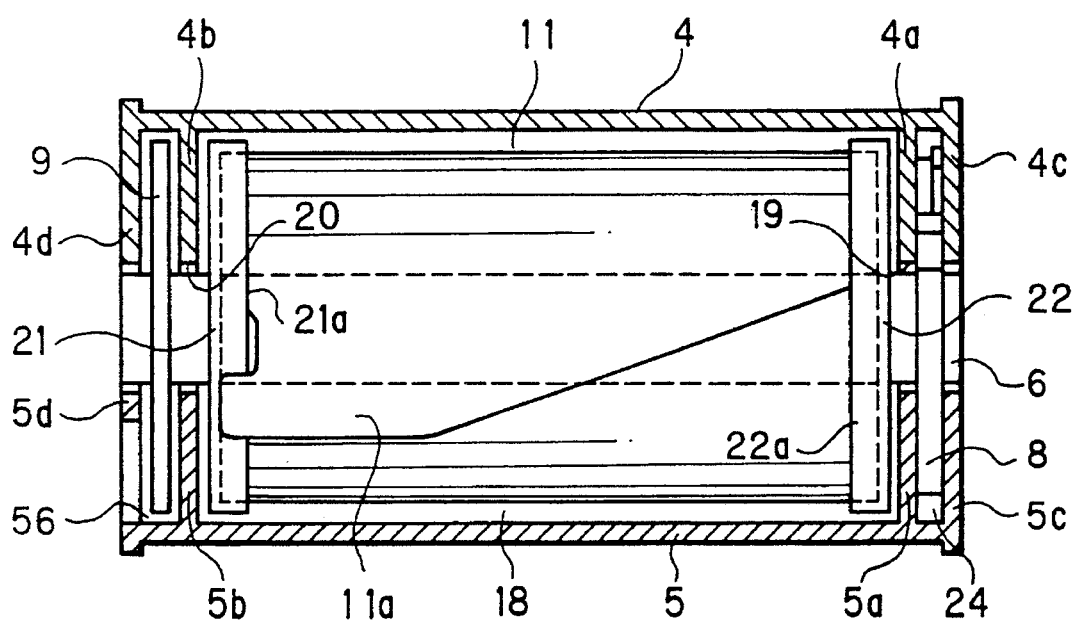
FIG. 2 is a horizontal section of the cassette of FIG. 1.

The upper and lower cassette shells 4 and 5 are both molded of resin. As illustrated in FIG. 2, the upper shell half 4 is provided with partitions 4a and 4b and the lower shell half 5 has partitions 5a and 5b. The partitions 4a, 4b, 5a and 5b divide the inside of the cassette shell 10 into three chambers.

To join up the shell halves 4 and 5, a hood 13a of the upper shell half 4 is engaged with a hook 14a of the lower shell half 5, and a hood 13b engaged is engaged with a hook 14b, while a ridge 15 of the upper shell half 4 is fitted into a groove 16 of the lower shell half 5. A line 10a defined between the shell halves 4 and 5 lies on a single plane surface except for the hooks 14a, 14b, 15a and 15b, the ridge 15 and the groove 16. The plane construction of the joining line 10a is favorable in facilitating molding the respective shell halves 4 and 5 because of the relatively small required molding precision. Accordingly, the shell joining step when producing the cassette, is performed easily and without failure. Therefore no ambient light will enter the cassette shell 10 through the joining line 10a between the shell halves 4 and 5. It is also possible, after engagement of the four hooks, to join the respective junctures of the shell halves 4 and 5 using ultrasonic wave devices or an adhesive agent.

Between the partitions 4a and 4b and the partitions 5a and 5b, there is formed a roll chamber 18 which contains a roll of the photographic film 11 wound on the spool 6. The four partitions are provided with bearing holes 19 and 20 in which the spool 6 is supported. On the spool 6 is formed a pair of flanges 21 and 22. The flanges 21 and 22 have circumferential lips 21a and 22a respectively, projecting therefrom. The lips 21a and 22a come in contact with the outermost turn of the roll of the photographic film 11 to prevent the roll of photographic film 11 from loosening. When the spool 6 is rotated, the lips 21a and 22a thus transmit the rotation to the roll of the photographic film 11. The flanges 21 and 22 with the lips 21a and 22a are preferably molded from a highly resilient material such as polypropylene and/or polystyrene. To cause the photographic film 11 to exit the cassette shell 10, the photographic film 11 is directed to the passage port 3 from the roll while the flanges 21 and 22 are spread apart from each other, by spreading projections (not shown), to release the film 11 from therebetween.

Figure 3:
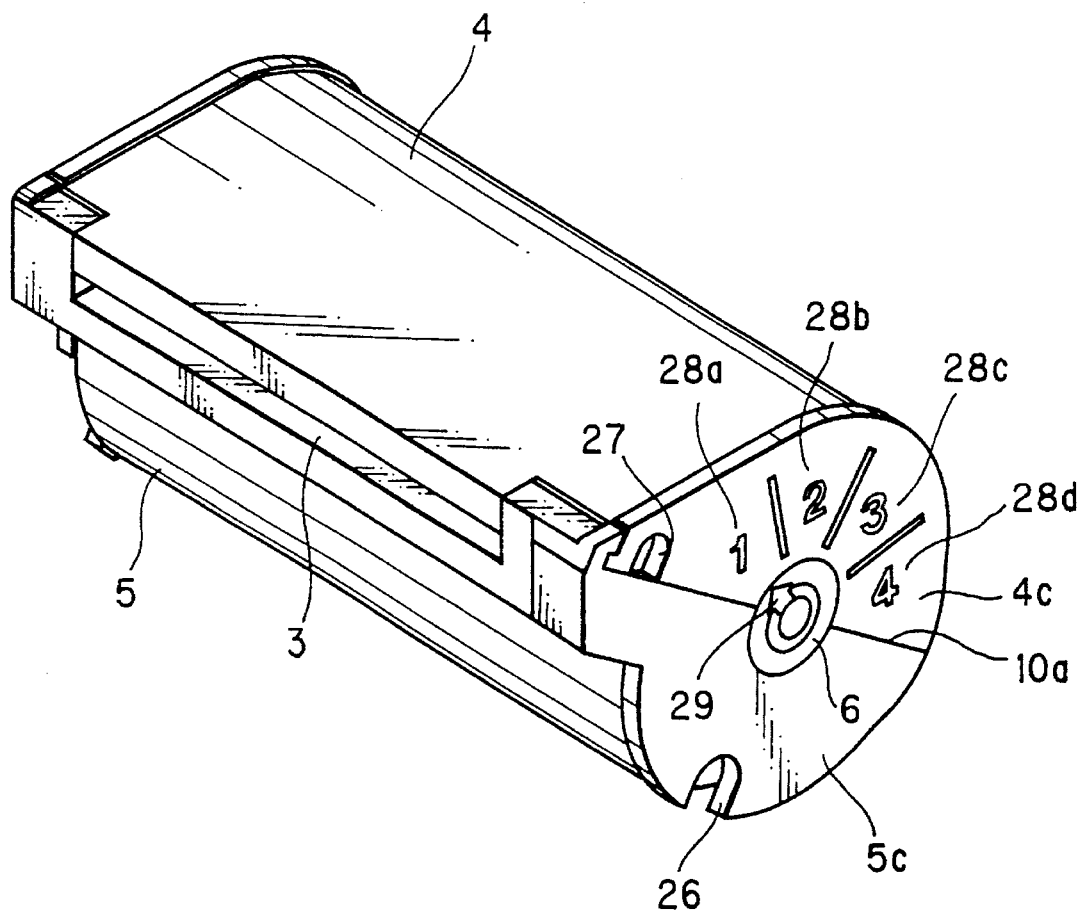
FIG. 3 is a perspective view illustrating the cassette of FIG. 1.

Between the partition 4a and an end wall 4c and between the partition 5a and an end wall 5c, a lever chamber 24 containing the lever 8 which is swingable on a shaft 25 is defined. The end wall 5c, as illustrated in FIG. 3, is provided with a cutout portion 26. The end wall 4c is provided with an access hole 27 and an indication marking 28. The axial end of the spool 6 has a pointer 29 coupled thereto. The cutout portion 26 represents that the sensitivity of the film is ISO 400 or higher according to International Standard Organization. If the cassette shell 10 lacks the cutout portion 26, the photographic film 11 would have a sensitivity under ISO 400. The cutout portion 26 can be detected when the cassette 2 is contained in a camera in order to detect the sensitivity of the film 11. This allows the camera to be constructed for a low cost because utilization of the magnetic recording and reading of the sensitivity information is expensive in comparison with utilization of a mechanical device for detecting the cutout portion 26.

The access hole 27 is adapted to receive a pin arranged on the inside of a cassette containing chamber of a camera. When such a camera pin is inserted into the cassette shell 10, the lever 8 is released from locking the spool 6, as will be described below in detail.

Figure 4:
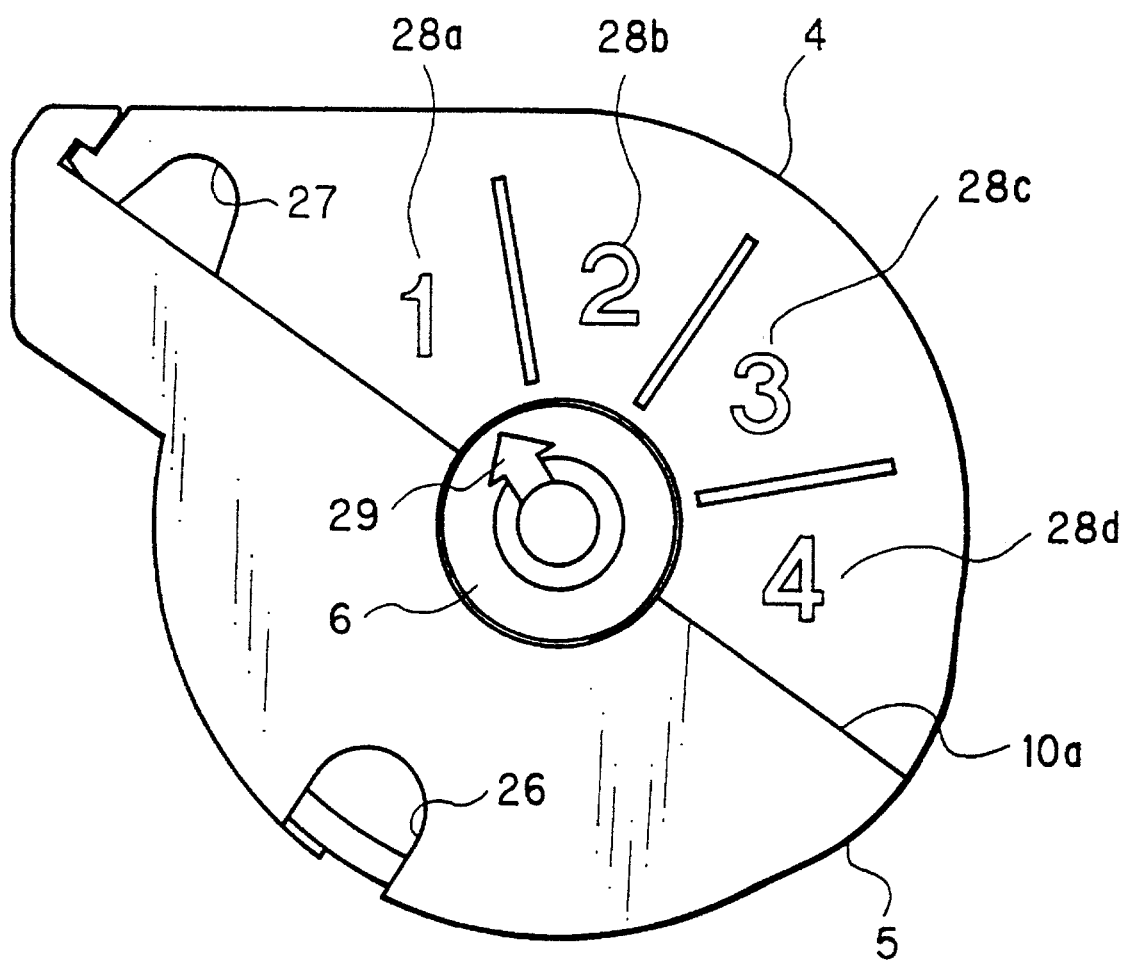
FIG. 4 is a side elevation illustrating the cassette of FIG. 1.

As illustrated in FIG. 4, the indication marking 28 is divided into four indicative areas 28a to 28d indicating numerical signs, 1, 2, 3 and 4. The numeral 1 represents a Completely Unexposed State of the photographic film 11. The numeral 2 represents a Partly Exposed State of the photographic film 11. The numeral 3 represents a Completely Exposed State of the photographic film 11, i.e., a state on an occasion where a user finishes using the photographic film and is ready to unload the cassette from a camera. Finally, the numeral 4 represents a Developed State of the photographic film 11. The pointer 29 on the spool 6 is positioned to point to a selected one of the four signs. When the cassette 2 is unloaded from a camera or photographic film processor for development, the spool 6 is latched for pointing the indication according to the information as desired, to let a user and/or operator know the current status of the photographic film 11.

Figure 5:
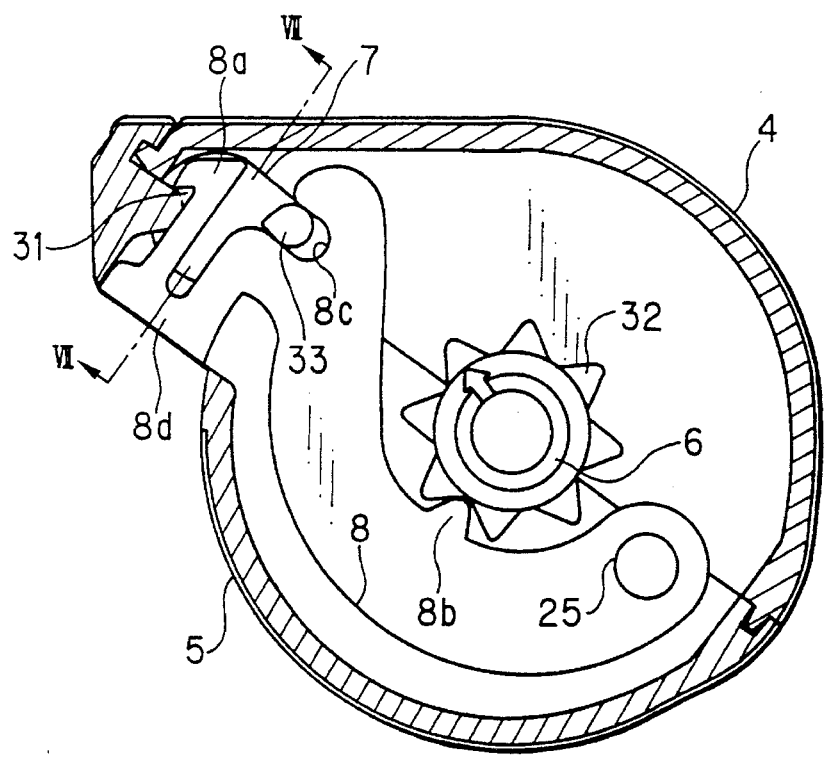
FIG. 5 is a cross section illustrating the cassette of FIG. 1, in which a spool is latched.

Before the cassette 2 is loaded in any apparatus, the lever 8 stands in the position illustrated in FIG. 5. The lever 8 is provided with a hook 8a, which is resiliently deformable, for regulating the movement of the lever 8, a claw 8b for stopping the spool 6 from rotating, a recess 8c for rotating the shutter rod 7, and an operable portion 8d for being pressed in order to move the lever 8 from a spool latching position in order to move the lever 8 from a spool latching position to a spool unlatching position. The hook 8a is engaged with an inside projection 31 formed inside the lever chamber 24 to retain the lever 8 immovably, while the claw 8b is engaged with a gear 32 attached to the spool 6 to prevent spool 6 from rotating. The recess 8c receives a pin 33 which is formed laterally on the shutter rod 7 and is shaped like a spindle when viewed vertically. The pin 33 is eccentric with respect to the rotational axis of the shutter rod 7. When the lever 8 is moved to the spool unlatching position, the shutter rod 7 is thus rotated clockwise by virtue of interaction between pin 33 and recess 8c. Note that, while the lever 8 does not operate, the shutter 7 is prevented from moving.

Figure 6:
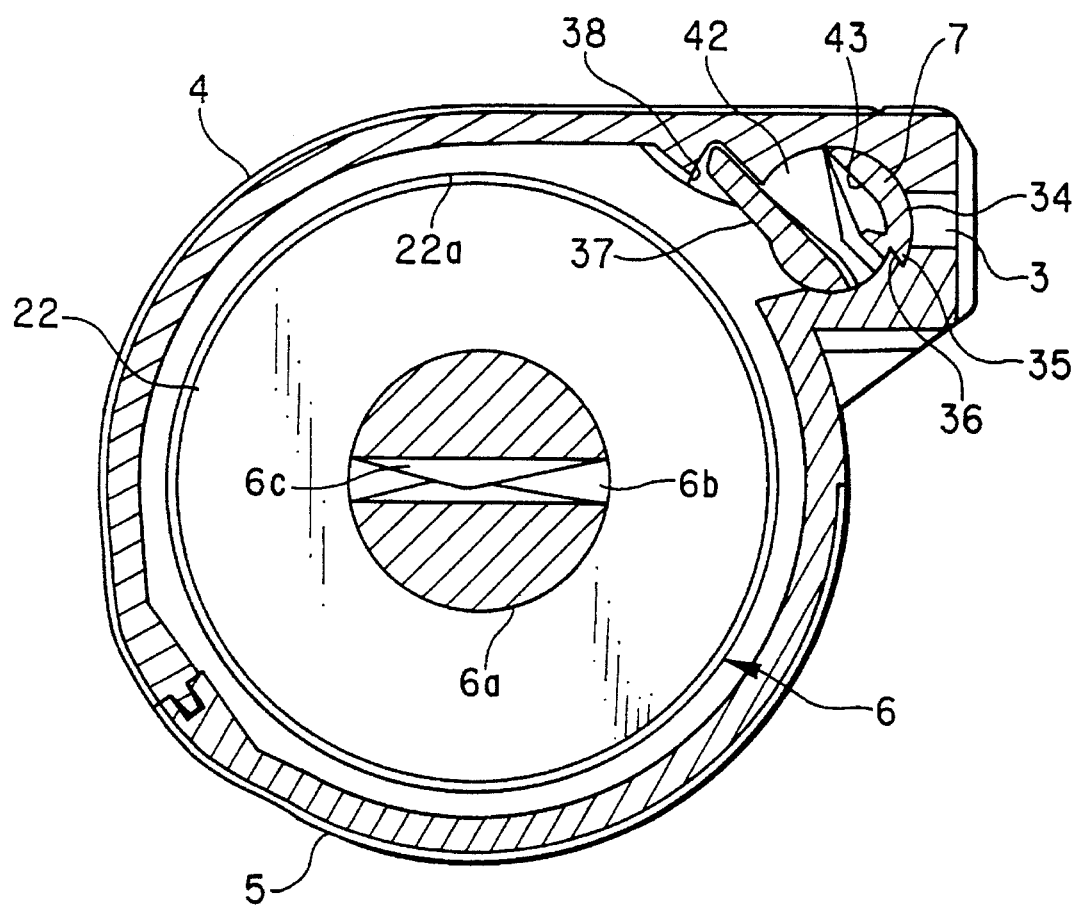
FIG. 6 is a cross section illustrating the cassette of FIG. 1, in which a shutter rod stands closed.

When the lever 8 stops the spool 6 from rotating, the passage port 3 is closed as illustrated in FIG. 6 by a light-shielding wall 34 of the shutter rod 7. The shutter rod 7 is provided with a stopper 35 which restricts the rotatable range of the shutter rod 7. The stopper 35 is received in a groove 36 formed in the lower shell half 5 to hinder the shutter rod 7 from further rotation. The stopper 35 is also effective to reliably shield the roll chamber 18 from ambient light. The shutter rod 7 is also provided with a separator claw 37. When the shutter rod 7 stands in a closed position, the separator claw 37 is received into a groove 38 in the upper shell half 4. When the shutter rod 7 rotates to assume an open position, the separator claw 27 comes in contact with the outermost turn of the roll of the photographic film 11, abuts on the roll, and separates a leader 11a (see FIG. 2) from the roll of the photographic film 11. After the leader 11a is separated, the photographic film 11 passes between the flanges 21 and 22 with the lips 21a and 22a, is passed through the passage port 3 and advanced to the outside of the cassette shell 10.

In a core 6a of the spool 6, there is formed a slot 6b, of which two walls are provided with respective claws 6c. An end of the photographic film 11 is inserted in the slot 6b, retained on the claws 6c, and then the film 11 is wound on the core 6a of the spool 6.

Figure 7:
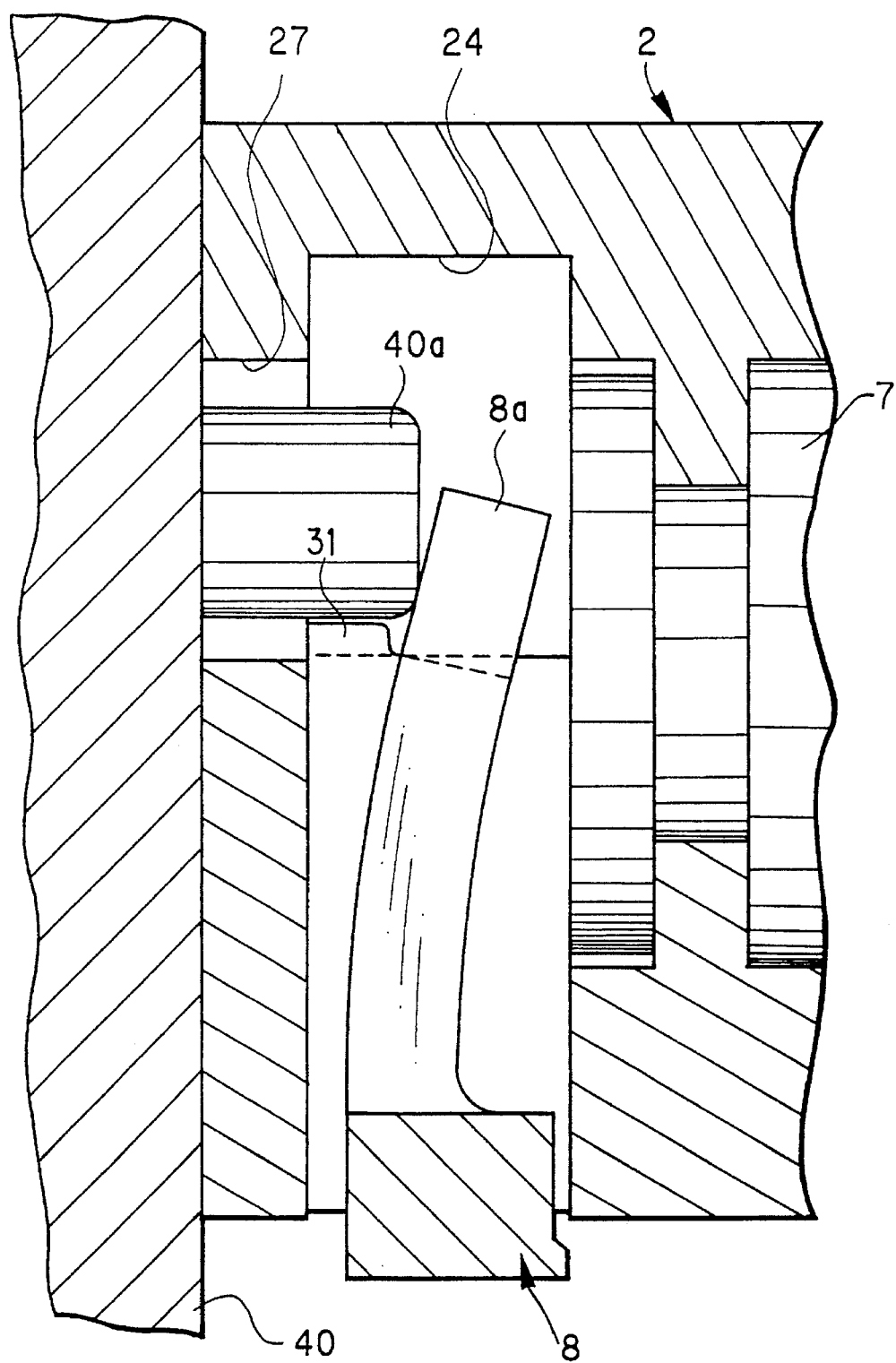
FIG. 7 is an explanatory view in section taken on Line VII—VII in FIG. 5, illustrating deformation of a locking lever of the cassette.

As illustrated in FIG. 7 a bottom lid 40 of the camera is closed with the cassette 2 loaded therein to insert a pin 40a through the access hole 27 into the cassette shell 10. The pin 40a presses the hook 8a of the lever 8. The hook 8 having been engaged with the inside projection 31 is pressed and deformed resiliently. As is shown, the hook 8a is deformed to move beyond the thickness of the projection 31. Thus the deformation disengages the hook 8a from the projection 31. The disengagement of the hook 8a brings the shutter 7 from a locked position toward an unlocked position.

Figure 8:
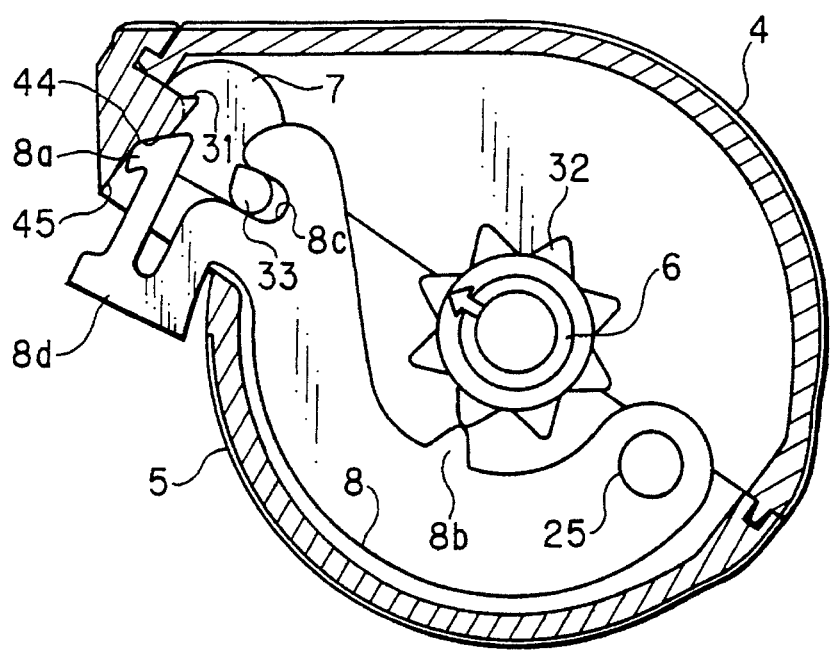
FIG. 8 is a cross section illustrating the cassette of FIG. 1, in which the spool is unlatched.
Figure 9:
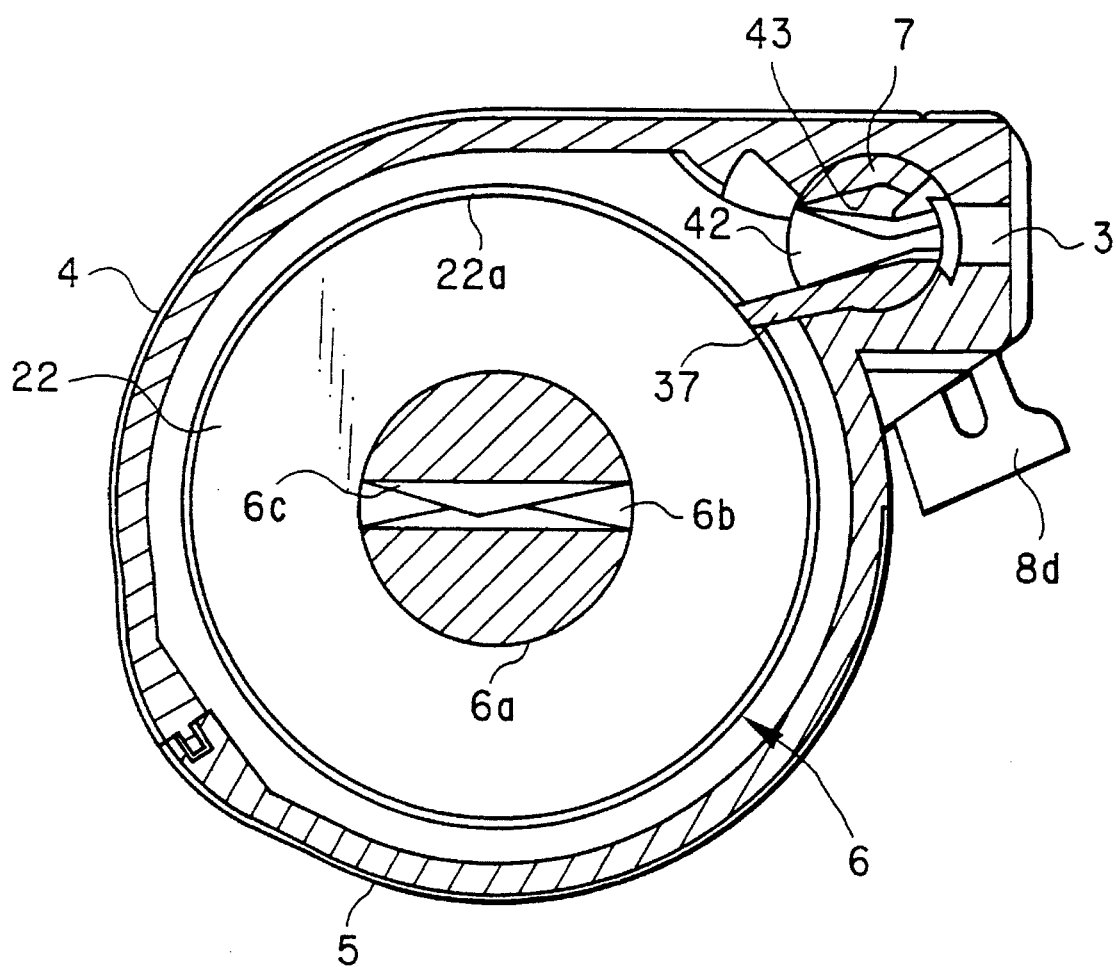
FIG. 9 is a cross section illustrating the cassette of FIG. 1, in which the shutter rod stands open.
Figure 10:
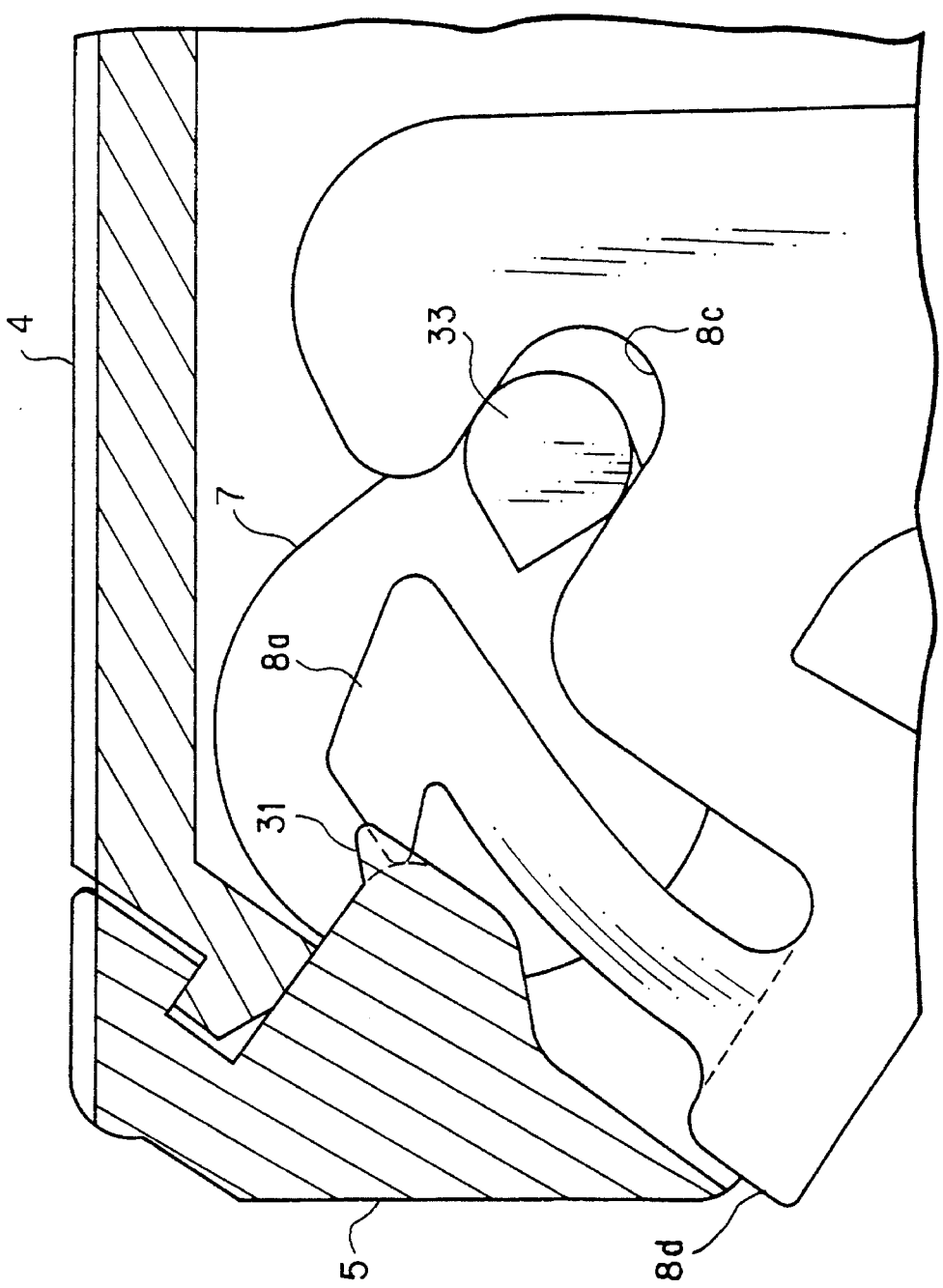
FIG. 10 is an explanatory view, in cross section, illustrating the lever while being swung.

Then a rotary shaft of the camera, coupled with the spool 6, rotates the spool 6. As the spool 6 rotates, the lever 8 is driven by the gear 32 and shifted to the unlatching position in FIG. 8. The lever 8 stands engaged with the pin 33 on the shutter rod 7, which is rotated in the counterclockwise direction in FIG. 6 until it comes to the open position in FIG. 9. A slot 42 formed through the shutter rod 7 is aligned with the passage port 3 to provide an open path for the photographic film 11. The separator claw 37 is now in contact with the outermost turn of the roll of the photographic film 11. FIG. 10 illustrates the hook 8a of the lever 8 while pressed inside the camera, in the course of movement of the lever 8 from the spool latching position to the unlatching position.

In FIG. 11, the passage port 3 is viewed from the front of the cassette 2. The phantom line illustrates the shape of the slot 42 while the shutter 7 stands in the open position. Lateral ends of slot 42 have spacings 42b which are smaller in thickness than the midway spacing 42a. The spacings 42b correspond to the outside of imaging frames to be created by exposure on photographic film 11. The spacing 42a is favorable in reducing the friction of the shutter rod 7 on the photographic film 11. With the less thick spacings 42b, the imaging frames on the photographic film 11 are prevented from being scratched on the shutter rod 7. As illustrated in FIGS. 6 and 9, the slot 42 is provided with an inside recess 43 formed in one inner face. The recess 43 prevents the shutter rod 7 from deformation due to the characteristic of the molded resin, in particular curvature in the longitudinal direction of the shutter rod 7. The recess 43 is also favorable in view of protecting the inside from ambient light, as there will never be any erroneous gap between the shutter rod 7 and relevant bearing faces on the cassette shell 10.

When the spool 6 rotates and shifts the lever 8 to the unlatching position, the hook 8a comes in contact with a jaw 44 of the lower shell half 5 and is positioned while in contact with the jaw 44. Through an opening 45 formed in the lower shell half 5, an operable end 8d of the lever 8 is projected to the outside. Further rotation of the spool 6 in the unwinding direction causes the photographic film 11 to exit through the passage port 3 to the outside through the slot 42. Various constructions are known for exiting the photographic film 11 to the outside in response to rotation of the spool 6. In the present embodiment, the lips 21a and 22a, formed around the flanges 21 and 22, are operated to prevent the roll of the photographic film from loosening around the spool 6, and thus transmit the rotation of the spool 6 to the turns of the roll of the photographic film 11.

In the course of rotation of the roll of the photographic film 11, the separator claw 37 separates the end of the leader 11a. The leader 11a is directed to the slot 42 and the passage port 3, and advanced to the outside. In the course of this movement of the leader 11a, a take-up spool incorporated in the camera begins to rotate. When the leader 11a advanced up to the rotating take-up spool, the leader 11a is taken up by the take-up spool, because the take-up spool frictionally captures the leader 11a, or otherwise captures the perforations formed in the leader 11a. The photographic film 11 is wound up by the take-up spool through further rotation.

Figure 12A:
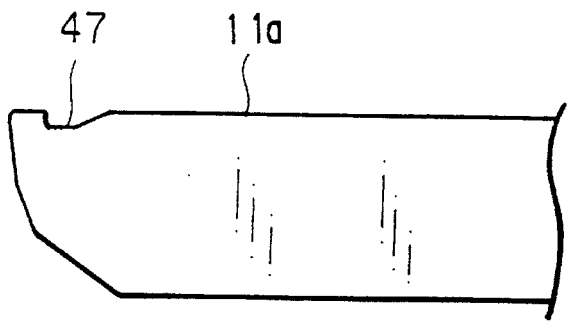
FIG. 12A is a plan view illustrating a leader of a photographic film according to a preferred embodiment.
Figure 12B:
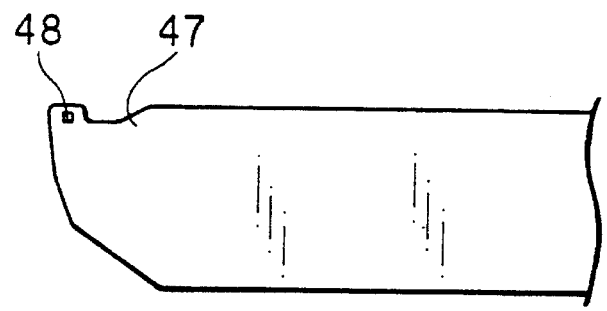
FIG. 12B, 12C, 12D and 12E are plan views illustrating variant forms of the leader of FIG. 12A.
Figure 12C:
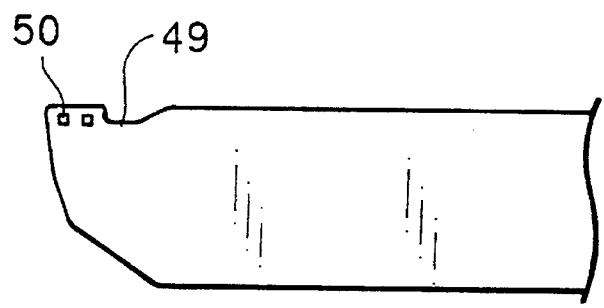
Figure 12D:
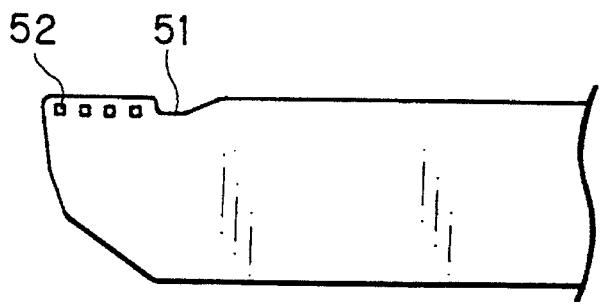
Figure 12E:
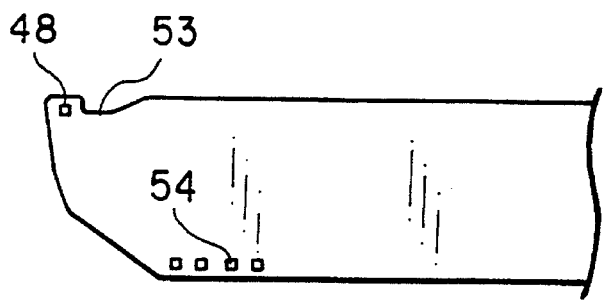

FIGS. 12A to 12E, illustrate preferable shapes of the leader of the photographic film. In FIG. 12A, a notch 47 is formed in the leader 11a for preventing a relevant lateral edge of the leader 11a from being intercepted by contact with the flange lip 21a of the spool 6 in the course of separation from the roll of the photographic film. The notch 47 is favorable as it allows the distal end of the leader 11a to be outside of the lip 21a to stand by for being separated by the claw 37. Note that the leader 11a lacks perforations. The leader 11a is adapted to be captured on the take-up spool by friction. In FIG. 12B, a leader has not only the notch 47 but one perforation 48 for the purpose of being captured by a claw on a take-up spool. In FIG. 12C, a leader has a different notch 49 and two perforations 50. In FIG. 12D, a leader has another notch 51 and three perforations 52. In FIG. 12E, a leader has a notch 53, the single perforation 48, and a plurality of perforations 54 on the edge opposite to the notch 53. It is preferable that such a notch be proximate the distal end of the leader 11a, because the distal end of the leader 11a can be separated from the lower roll of the photographic film 11 to facilitate film advancement.

Figure 13:
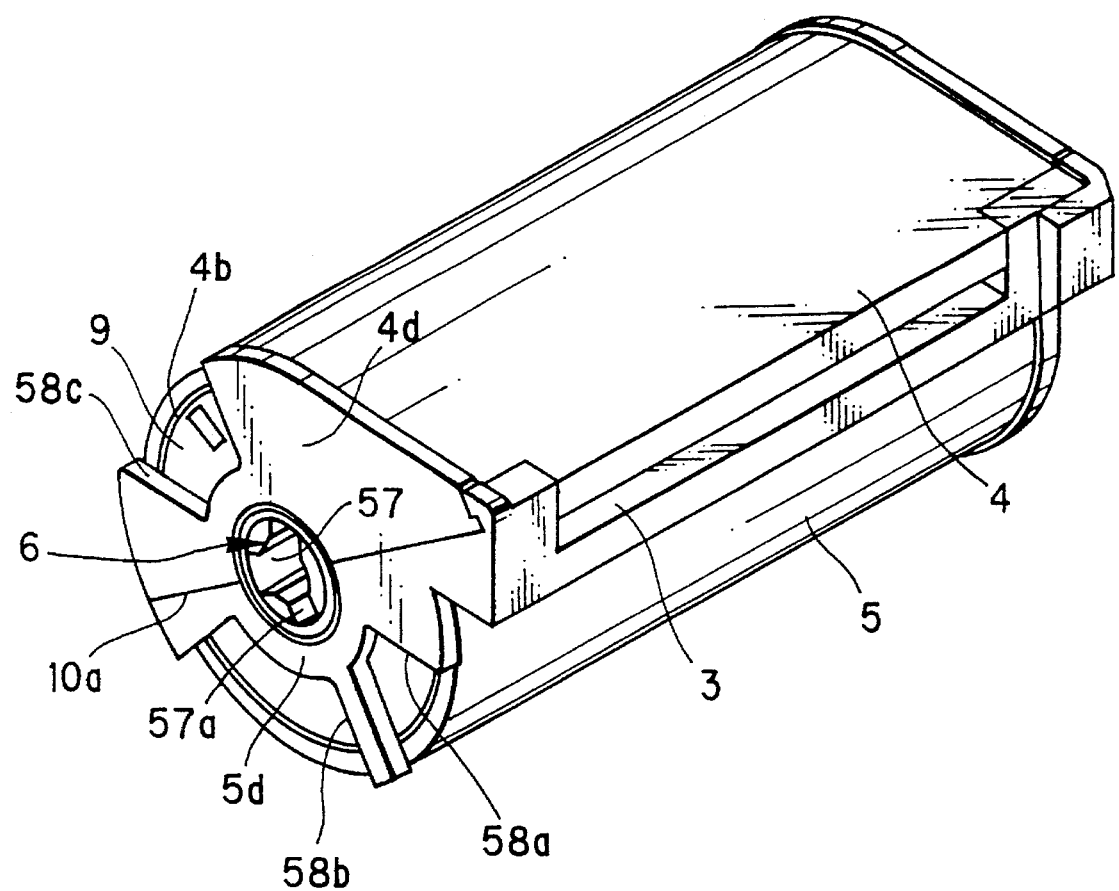
FIG. 13 is a perspective view illustrating the cassette of FIG. 1 as viewed from an opposite lateral side.

Between the partition 4b and an end wall 4d and between the partition 5b and an end wall 5d, there is formed a disk chamber 56 containing the signaling disk 9 formed on the spool 6, as illustrated in FIG. 2. In FIG. 13, the end wall 4d is provided with an opening 58c. The end wall 5d is provided with openings 58a and 58b. The disk 9 partly appears externally through the openings 58a, 58b and 58c. The partitions 4b and 5b are joined together, so that the ambient light coming into the disk chamber 56 through the three openings is prevented from entering the roll chamber 18. The distal end of the spool 6 appearing externally between the end walls 4d and 5d is provided with an axial hole 57 into which the rotary shaft of the camera is fitted for rotating the spool 6. The axial hole 57 has three keys 57a formed to extend in different radial directions. The central angles of the keys 57a are all different: 100, 120 and 140 degrees substantially. The rotary shaft of the camera is constructed in correspondence with keys 57a, to be coupled with the spool 6 at one unique predetermined rotational position relative to the spool 6.

Figure 14:
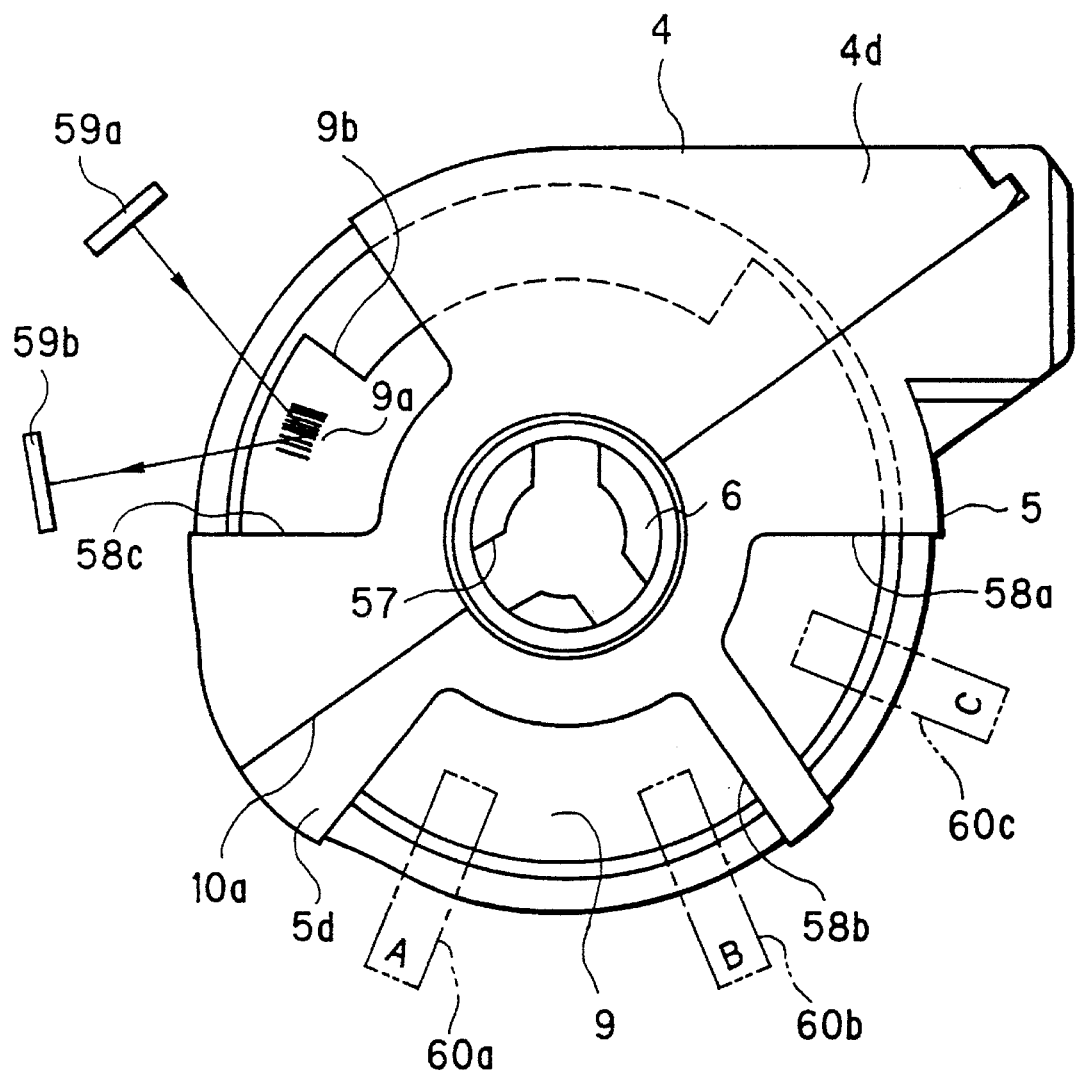
FIG. 14 is a side elevation illustrating the cassette of FIG. 1 as viewed from the opposite lateral side.

As illustrated in FIG. 14, the surface of the disk 9 is provided with a bar code 9a and a sectorial recess 9b. The bar code 9a represents information of the photographic film 11 such as sensitivity and the maximum number of imaging frames. The camera adapted for use with the cassette 2 is provided with bar code reader 59, and contact sensors 60a, 60b and 60c. The bar code reader 59 is positioned in the cassette containing chamber to correspond with the opening 58c of the cassette 2, and photoelectrically reads the bar code 9a to detect the information, while the spool 6 rotates. The sensors 60a and 60b are positioned to correspond with the opening 58b. The sensor 60c is positioned to correspond with the opening 58c. When the three sensors detect the sectorial recess 9b, electrically, mechanically or photoelectrically, the on/off states of the sensors change.

The spool 6 rotates together with the pointer 29 as well as the disk 9, so that the rotational position of the pointer 29 is correlated with that of the disk 9. When the cassette 2 is contained in the camera, the rotational position of the pointer 29 is correlated with that of the disk 9. When the cassette 2 is contained in the camera, the rotational position of the spool 6 is monitored by the camera constantly, due to the drive shaft and a relevant electrical arrangement for monitoring and detecting the rotational position thereof. For example, an optical encoder device can be used to monitor the rotational position of the spool 6. Accordingly, the camera is constructed to be able to stop the spool 6 in a desired rotational position through known control devices.

Further, the disk 9 may be provided with a signaling portion for representing an original position in the course of rotation. A camera may have a sensor for detection of the signaling portion so that the camera performs a feedback control for stopping the spool 6 in the desired position. After the spool 6 is stopped, the operable end 8d of the lever 8 is depressed by a mechanism incorporated in the camera. The lever 9 is returned to the locked position, and the shutter rod stands in the closed position. The lever 8 once again is in the latching position to prevent the spool 6 from rotating.

After the cassette 2 with the unexposed photographic film 11 is loaded into the camera, the photographic film 11 is exposed to create all of the imaging frames. All the photographic film 11 is then rewound into the cassette shell 10. The spool stopping control above is utilized in the following manner: during rotation of the spool 6, the spool 6 is controlled to stop in the position where the pointer 9 points to the indicative area 28c with the numeral 3 of the indication marking 28. The cassette 2 is then unloaded from the camera. Therefore, it is possible to visually recognize that the cassette contains the completely exposed photographic film 11.

It is possible that the camera is loaded with the cassette 2 and the cassette 2 is unloaded without completely exposing the photographic film 11. As is known from International Publications WO 90/4201 and 90/4202, the photographic film 11 can be provided with a magnetic recording layer, with which the area outside the effective imaging frames can be used for magnetic recording. In such a case, the camera is provided with a magnetic head for magnetically recording on the recording area the information representing the number of the exposures or imaging frames created on the photographic film. The photographic film 11 can be wound back into the cassette shell 10 before it is exposed entirely. In such a case, the spool 6 is rotated, and controlled to stop in the position where the pointer 29 points to the indicative area 28b with the numeral 2 in the indication marking 28. When the cassette 2 is unloaded from the camera, it is possible to visually recognize that the cassette contains the partly exposed photographic film 11. To use this cassette again for photography, the camera reloaded with the cassette reads, via the magnetic head, the information from the recording layer on the photographic film, detects the number of the exposed imaging frames, advances the photographic film to position an imaging frame next to be created, and sets the counter to a number appropriate for an exposure next to be taken. Thus photography can be performed even when the photographic film has been partly exposed.

The cassette 2 can also be used for containing the photographic film 11 after development. To indicate that the developed photographic film 11 is contained, the pointer 29 is directed to the numeral 4 in the indication marking 28. After exposure of the photographic film 11, the cassette 2 containing the photographic film 11 is set into an automatic photographic film processor, in which the photographic film 11 is drawn out and developed. The photographic film 11 is then wound back into the cassette shell 10. Afterwards the spool 6 is controlled to stop in the position of the pointer 29 to point to the indicative area 28d with the numeral 4 in the indication marking 28. Note that it is possible to set cassette 2 in a printer with the developed photographic film 11 and to print photographs from the photographic film 11. To do this, the photographic film 11 after printing is wound back to control the spool 6 to stop in the position where the pointer 29 points to the numeral 4.

Figure 15:
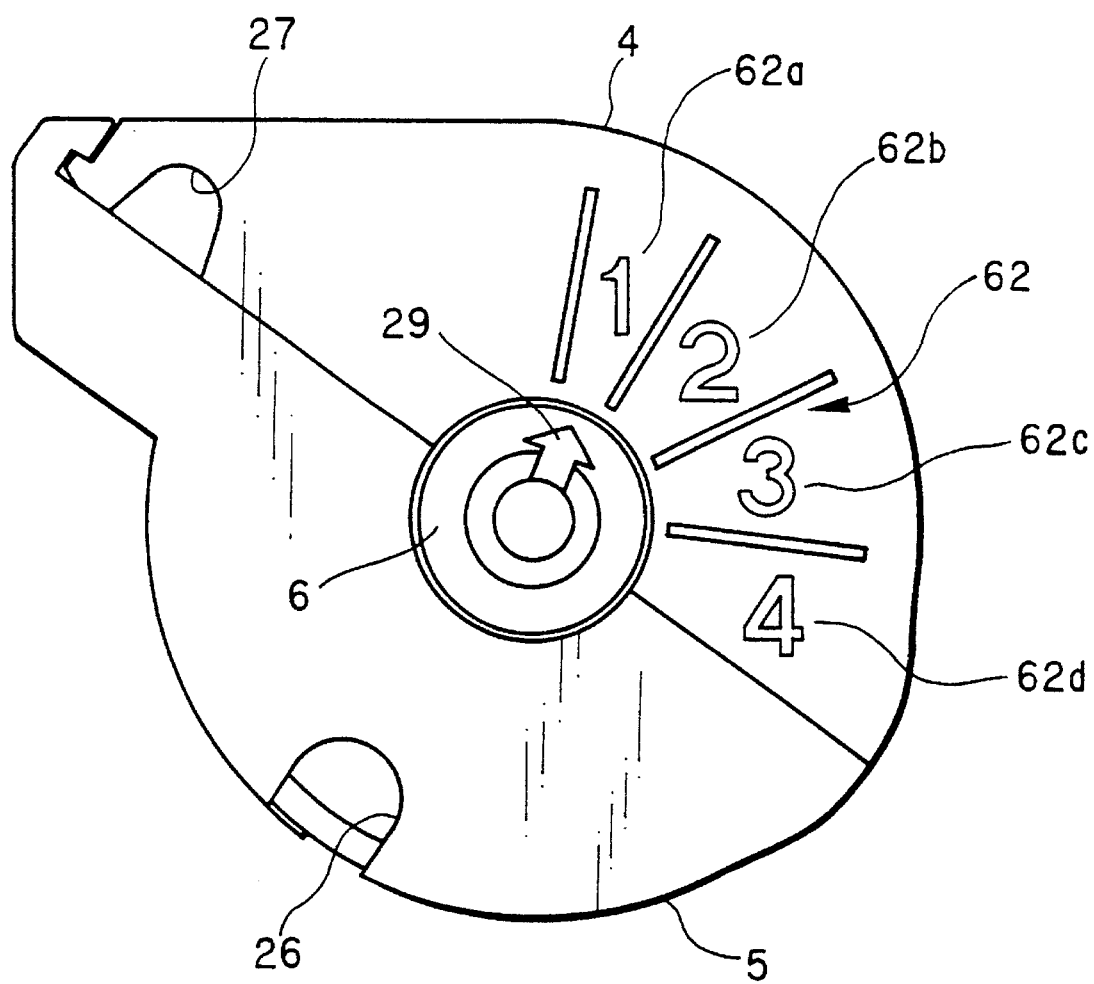
FIG. 15 is a side elevation illustrating a cassette according to another preferred embodiment in which indicative areas are differently formed.

The above description shows that the indicative areas 28b to 28d with the numerals 2, 3 and 4 in the indication marking 28 are indicated when controlled by external photographic apparatuses inclusive of a camera, processor, and printer. Unlike this, the indicative area 28a with the numeral 1 in the indication marking 28 can be controlled in the course of manufacturing the cassette 2. It is conceivable that a control of stopping the spool 6 could be more erroneous and less precise with the external apparatuses than with the precision apparatus used during manufacture. Taking this into consideration, a variant preferred indication marking 62 is provided for a novel cassette of another embodiment as illustrated in FIG. 15.

Indicative areas 62b to 62d for the numerals 2, 3 and 4 are large, in comparison an indicative area 62a for the numeral 1 is small. The larger indicative areas 62b to 62d for the numerals 2, 3 and 4 are advantageous for compensating for the low precision in the spool stopping control, so that the indication of the Partly Exposed State, the Completely Exposed State, and the Developed State of the photographic film 11 can be reliably accomplished. The smaller indicative area 62a for the numeral 1 is also advantageous, because the limited space on the end face of the cassette shell 10 can be used economically while the Completely Unexposed State of the photographic film 11 is precisely indicated.

Figure 16:
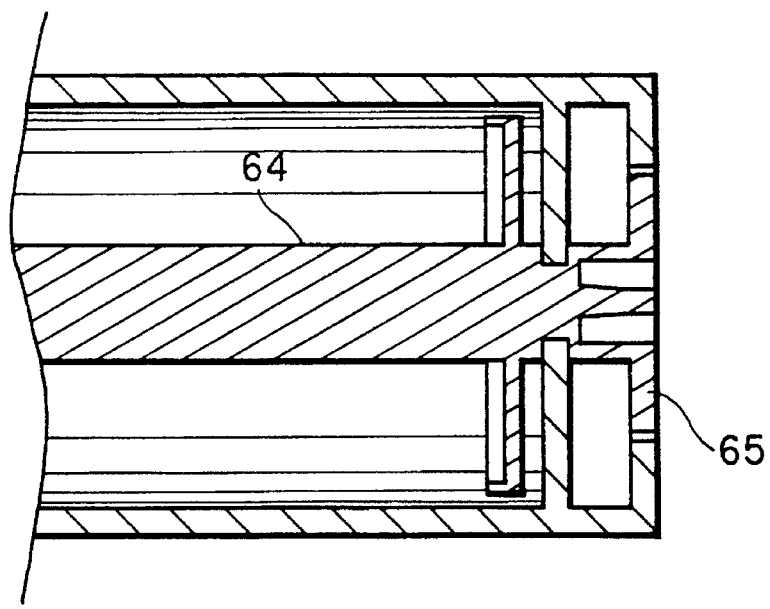
FIG. 16 is an explanatory view of horizontal section illustrating a cassette of a preferred embodiment in which a spool has a pointer disk.
Figure 17:
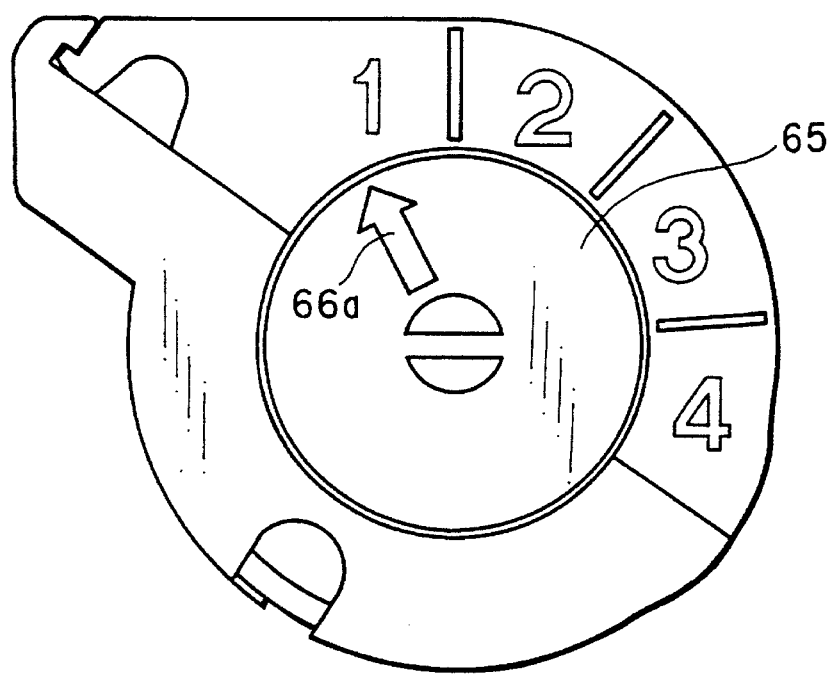
FIG. 17 is a side elevation illustrating the cassette of FIG. 16.

Recognition of the pointer 29, which is far smaller than the indication marking 28 with the four indicative areas 28a to 28d, may be difficult and problems may arise in misreading the numerals 1 to 4. Thus even when the photographic film is in the Completely Exposed State or the Developed State, the cassette might be erroneously loaded into the camera. A preferred embodiment of a cassette solving such problems is illustrated in FIG. 16. A pointer disk 65 is formed integrally with the axial end of the spool 64 for the purpose of enlarging a pointer 66 as illustrated in FIG. 17. Note that an excessively large pointer disk 65 may cause difficulties in recognition of the indication, and thus it is preferable to set the diameter of the pointer disk 65 at the proportion from 1/5 to 7/10 with respect to the diameter of the face of the cassette shell, more preferably 1/3 to 3/5. The pointer disk is favorable for visual recognition.

Figure 18:
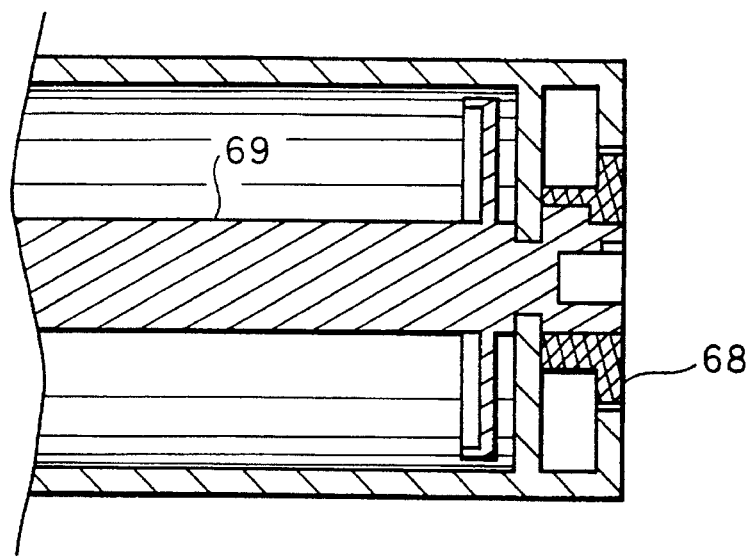
FIG. 18 is an explanatory view in horizontal section illustrating a cassette of a preferred embodiment in which a pointer disk is fitted on a spool.
Figure 19A:
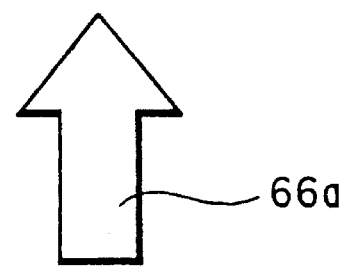
FIG. 19A is a plan view illustrating a pointer of the cassette in FIG. 16.
Figure 19B:
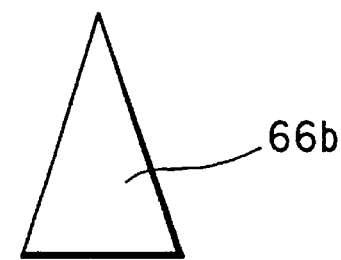
FIG. 19B, 19C and 19D are plan views illustrating variant forms of a pointer of the cassette of FIG. 16.
Figure 19C:
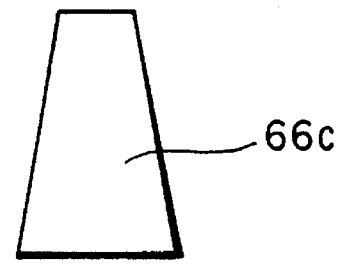
Figure 19D:
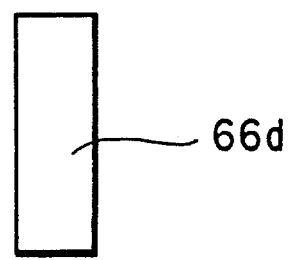

It is also preferable as illustrated in FIG. 18 to construct a separately formed pointer disk 68, which is fitted on to a spool 69, by engagement of a key and a groove receiving the key. Those pointers described above can be formed by printing on the disks or they can be molded integrally with the disks to be a recess or a projection. If the pointer is a printed structure, a preferable color of the pointer is somewhat different from that of the disk, or otherwise has a high contrast to the latter. The shape of the pointer can be different for pointing one direction; like an arrow 66a as in FIG. 19A, triangular 66b as in FIG. 19B, trapezoidal 66c as in FIG. 19C, or rectangular 66d as in FIG. 19D. Note that, in the cassettes in FIGS. 16 and 18, the photographic film 11 is omitted for the purpose of convenience in understanding.

Difficulties in handling the photographic film 11 arise when information of any of the numerals 1 to 4 is mistaken for other information, in particular the pointer is misdirected after the spool is stopped. Errors in handling the photographic film are shown in Table 1A, with associated potential problems shown in Table 1B:

TABLE 1A

| Indicated Wrong Information | | |
|---|---|---|
| | 1 | Exposed film is mistaken as Completely Unexposed, exposure of the film is newly started. |
| | 2 | The film is mistaken as Partly Exposed, only a partly remaining film portion is exposed. |
| | 3 | The film is mistaken as Completely Exposed, and the film is developed. |
| | 4 | The film is mistaken as Developed, and is handled without shielding it from ambient light. |

| | | Correct Information to be Indicated | | | |
|---|---|---|---|---|---|
| | | 1 | 2 | 3 | 4 |
| Indicated Wrong Information | 1 | — | Double Exposure (x) | Double Exposure (x) | No production of latent images |
| | 2 | Exposed Only Partly W/Waste | — | Double Exposure (x) | No production of latent images |
| | 3 | Film Wasted | Available Only Partly W/Waste | — | No production of latent images |
| | 4 | Film Fogged & Wasted | Images Fogged & Lost (x) | Images Fogged & Lost (x) | — |

The most serious errors in handling the cassette take place in the errors as indicated with the mark (x) in Table 1B. In such cases, latent images, recorded but undeveloped, are subjected to a repeated exposure or ambient light, and thus are fogged and damaged. The problem is most serious when the film is completely exposed. As is understood from Table 1B, in such a case, a serious problem takes place, regardless of which indicative areas of the numerals 1, 2 and 4 are indicated by the pointer while the photographic film is actually completely exposed.

Figure 20:
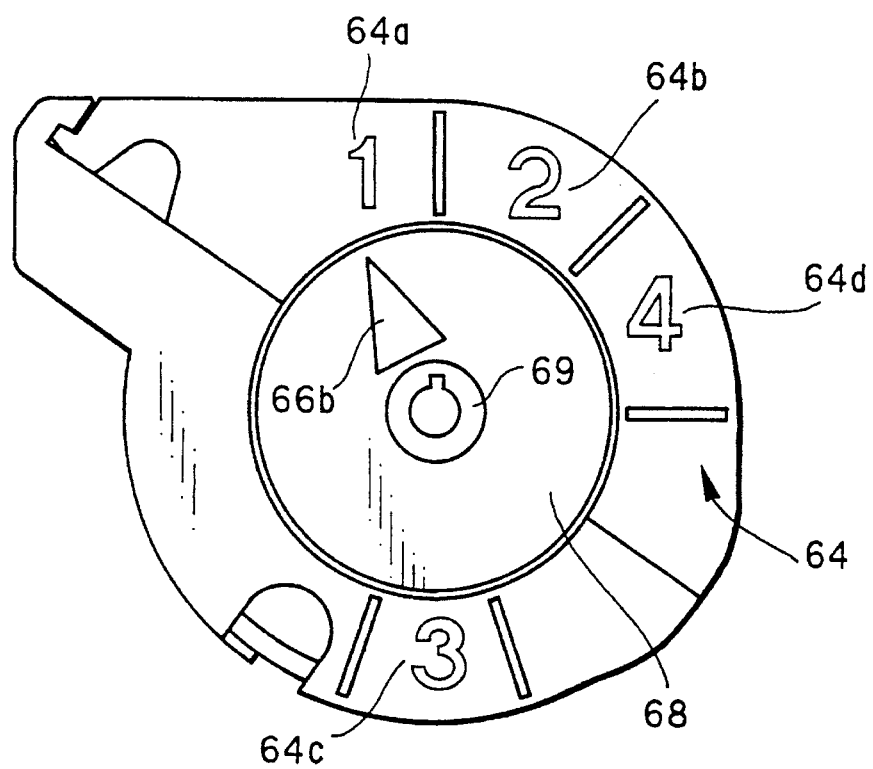
FIG. 20 is a side elevation illustrating a preferred embodiment of a cassette in which indicative areas are further improved.

To avoid the above problems associated with incorrect indication, it is preferred, as illustrated in FIG. 20, to construct an indication having an indicative area 64c of the numeral 3, which is associated with completely exposed film, in a location which is apart from other adjacent indicative areas 64a, 64b and 64d of the numerals 1, 2 and 4, respectively. Even when the pointer 66b, intended to point to indicative area 64c, is stopped to point to a position deviated from the rotational range of the indicative area 64c, there is little possibility that the pointer 66b will appear to point to different areas 64a, 64b and 64d.

The operation of the disk 9 will now be described. The disk 9 rotates together with the spool 6. The spool 6 is then stopped in a predetermined position. The lever 8 locks the spool 6 in the predetermined position. The cassette 2 is loaded into the camera or another apparatus having the contact sensors 60a, 60b and 60c, which detect the position of the sectorial recess 9b electrically, photoelectrically or by any other method (see FIG. 14). The camera or other apparatus can thus automatically detect rotational position of the spool 6 and thus the status of exposure of the photographic film 11 in the same four grades of the indications, namely the Completely Unexposed State, Partly Exposed State, Completely Exposed State, and Developed State of the photographic film 11. Note that the sectorial recess 9b can be adapted to judgment of allowance and inhibition of loading the camera, printer or other apparatus. In particular, a mechanical, or other, device can be positioned in the apparatus in a manner which prevents loading of the cassette when sectorial recess 96 is not in a desired position.

Table 2 as below illustrates the possibility of use of loading the external photographic apparatuses with the cassette 2.

TABLE 2

|  | Film Status | | | |
| --- | --- | --- | --- | --- |
|  | 1 | 2 | 3 | 4 |
| Camera Unadaptable To Partly Exposed Film | Usable | x | x | x |
| Camera Loadable W/ Partly Exposed Film | Usable | Usable | x | x |
| Film Processor | x | Usable | Usable | x |
| Printer | x | x | x | Usable |
| Photo Film Video Player | x | x | x | Usable |

As is understood from Table 2, apparatuses which are loadable with a photographic film cassette are only useable when the photographic film is of the proper status. Difficult situations are thus classified, in which serious problems, such as double exposures, should be avoided. Note that a "camera unadaptable to partly exposed film" is an inexpensive camera which does not have the capability of determining which portion of the film has already been exposed and thus in which a cassette containing the partly exposed photographic film is inhibited from being loaded although the photographic film has an available portion for photography. A "camera loadable with partly exposed film" is a camera in which even a cassette containing the partly exposed photographic film can be loaded. This photographic film is provided with the magnetic recording layer and such a camera is provided with a magnetic reader which reads information from the recording layer, and advances the photographic film to position the next unexposed imaging frame in the exposure position. A "photographic film video player" is an apparatus for picking up an image on the photographic film after development to display a positive image of the image from the photo film on a CRT. Such a photographic film video player is similar to a photographic printer in that they are loaded with the photographic film cassette containing developed photographic film.

Table 3 illustrates the combinations of signals from the contact sensors 60a, 60b and 60c detecting the sectorial recess 9b, according to a three-bit system and according to a two-bit system by use of only two sensors 60a and 60b. The sensors 60a, 60b and 60c are represented by Positions A, B and C.

TABLE 3

|  |  | 2-bit Sys. | | 3-bit System | | |
| --- | --- | --- | --- | --- | --- | --- |
|  |  | Pos. A | Pos. B | Pos. A | Pos. B | Pos. C |
| Film Status | Unexposed | o | o | o | o | o |
|  | Partly Exposed | x | o | x | o | o |
|  | Completely Exposed | x | x | x | x | o |
|  | Developed | o | x | x | x | x |

The o's in Table 2 represent a lack of the sectorial recess 9b in opposition to the associated sensor, The x's represent detection of the sectorial recess 9b in opposition to the associated sensor, Table 4 illustrates the combinations of positions and types of contact sensors required practically for the external photographic apparatuses.

TABLE 4

|  | 2-bit System | | 3-bit System | |
| --- | --- | --- | --- | --- |
|  | Pos. | Sensor Type | Pos. | Sensor Type |
| Camera Unadaptable To Partly Exposed Film | A & B | Hook | A | Hook |
| Camera Loadable W/Partly Exposed Film | B | Hook | B | Hook |
| Film Processor | A | Photo or Electrical | A & C | Photo or Electrical |
| Printer | A & B | Photo or Electrical | C | Photo or Electrical |
| Photo Film Video Player | A & B | Photo or Electrical | C | Photo or Electrical |

As is understood from Tables 3 and 4, both two-bit and three-bit systems are available for detecting the status of the photographic film 11 in the cassette 2 among the Unexposed, Partly Exposed, Completely Exposed and Developed States. Note that the "Hook" in Table 4 is a hooking mechanism arranged inside a camera for hindering the camera from being loaded with the cassette in the course of insertion into the camera, for the purpose of inhibiting double exposure. This can be a construction as disclosed in U.S. Pat. No. 4,994,828, and can be substituted for the contact sensors as described above.

It is apparent from the Tables above that the three-bit system is preferred to the two-bit system for an inexpensive construction of the camera which is unadaptable to the partly exposed photographic film to avoid double exposure on the film at the previously created image frames. The two-bit system requires the camera to have the two contact sensors 60a and 60b in Positions A and B. Inclusion of the two sensors in the camera will raise the cost of the camera, and is inconsistent with the purpose of a low cost camera. In comparison with this, the three-bit system only requires the camera to have the single contact sensor 60a. In other words, neglecting the possibility of partial exposure status, if the sectorial recess 9b is at position A, the film is useable, otherwise, the film is not useable for photography.

The three-bit system is also preferable to apparatuses other than cameras. The two-bit system is less preferable, because it requires a photographic printer and a photographic film video player to have the two sensors in the two Positions of A and B for detecting the sectorial recess 9b. In comparison with this, the three-bit system only requires the apparatuses to have the sensor in the single Position of C, except for the photographic film processor. Accordingly, the three-bit system is preferable for discrimination of any of the four states. Note that, although the three-bit system requires the photographic film processor to have the sensors in the two Positions of A and C, the additional cost is less of a problem because the photographic film processor is expensive anyway and is sold to photofinishers.

The above first embodiment has the disk 9 integrally mounted with the spool 6. Alternatively, a disk and spool can be separately molded and fitted together. In the above embodiment, the flanges of the spool have respective circumferential lips. Alternatively, to prevent the roll of the photographic film 11 from loosening, annular ridges can be provided on the inside of the cassette shell.

Figure 21:
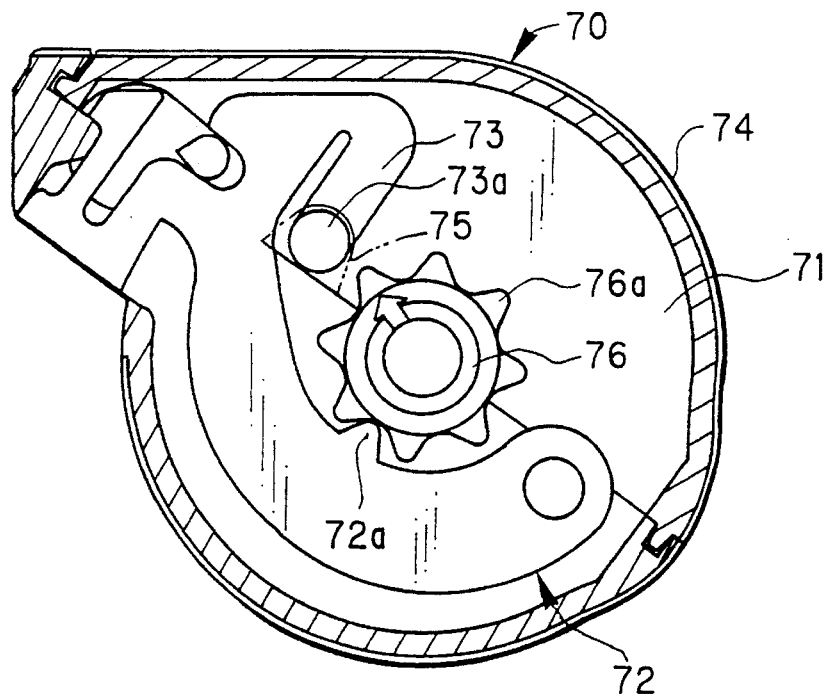
FIG. 21 is a cross section illustrating another preferred embodiment of a cassette, in which a spool is latched.

FIG. 21 illustrates another preferred embodiment of the present invention. A photographic film cassette 70 has a lever chamber 71a defined therein. Although the lever of the former embodiment has the hook 8a, alternatively a locking lever 72 of the present embodiment has a deformable portion 73. The deformable portion 73 has pin 73a, which, when the lever 72 stands in the spool latching position, is inserted in an access hole 75 formed in an upper shell half 74.

Figure 22:
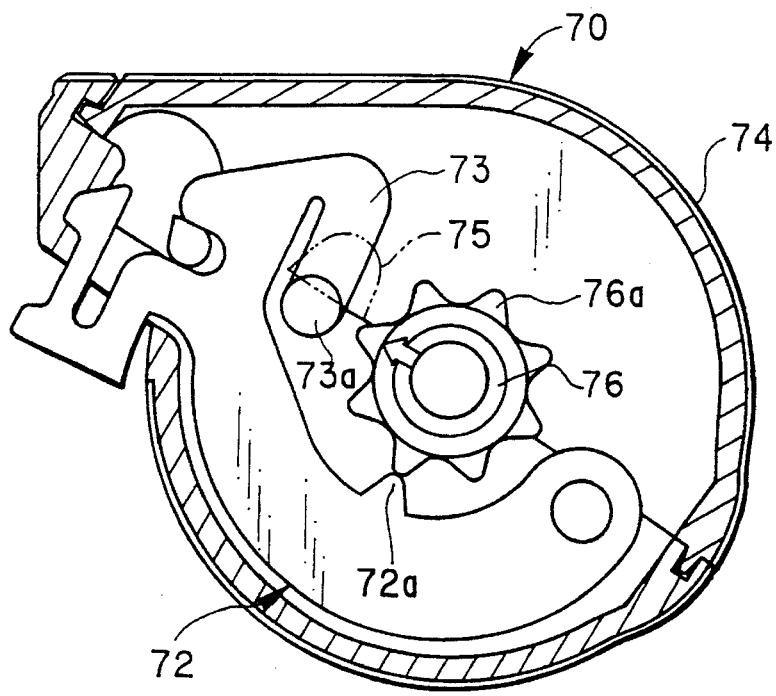
FIG. 22 is a cross section illustrating the cassette of FIG. 21, in which the spool is unlatched.

When the cassette 70 is loaded in a camera, a pin formed on a chamber door of the camera enters the hole 75 and presses the pin 73. The deformable portion 73, with the pin 73a, is thus deformed resiliently and the pin 73a is disengaged from the access hole 75. A spool 76 of the cassette 70 is then rotated by a drive shaft of the camera. A gear 76a of the spool 76 presses a claw 72a of the lever 72 to swing the lever 72 to the unlatching position in FIG. 22. The remaining operation is similar to that of the first embodiment.

Figure 23:
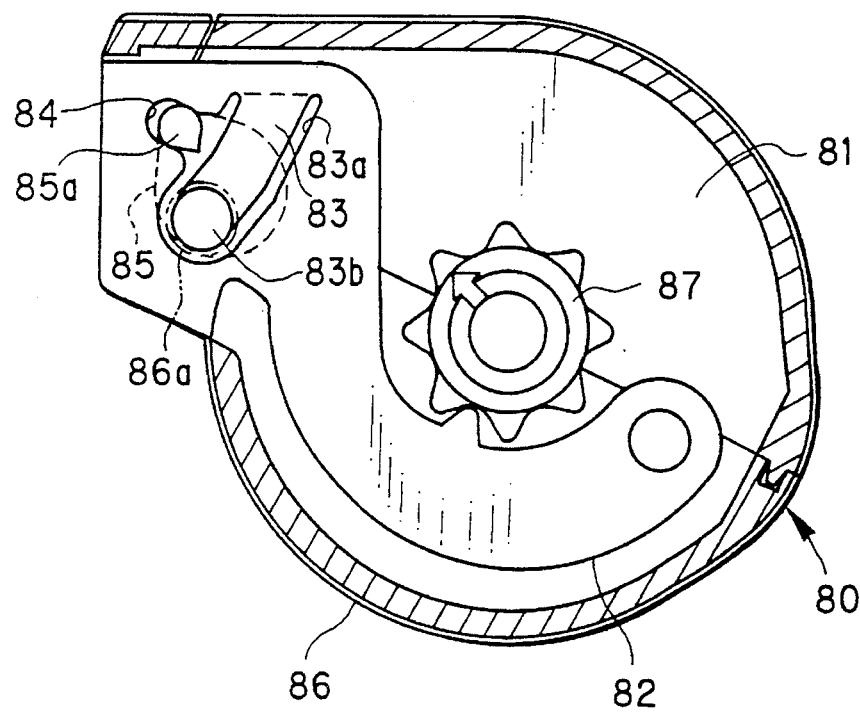
FIG. 23 is a cross section illustrating another preferred embodiment of a cassette, in which a spool is latched.
Figure 25:
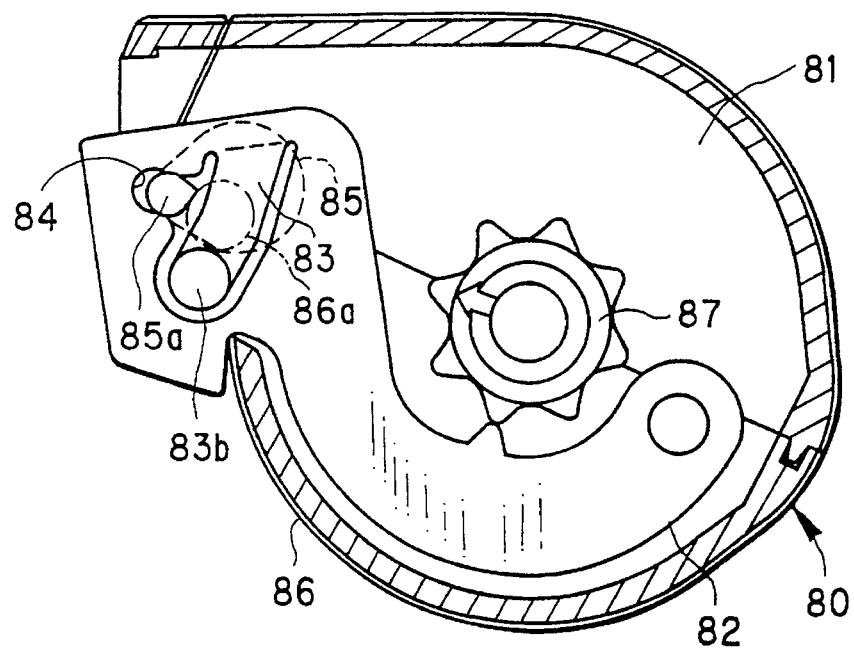
FIG. 25 is a cross section illustrating the cassette of FIG. 23, in which the spool is unlatched.
Figure 24:
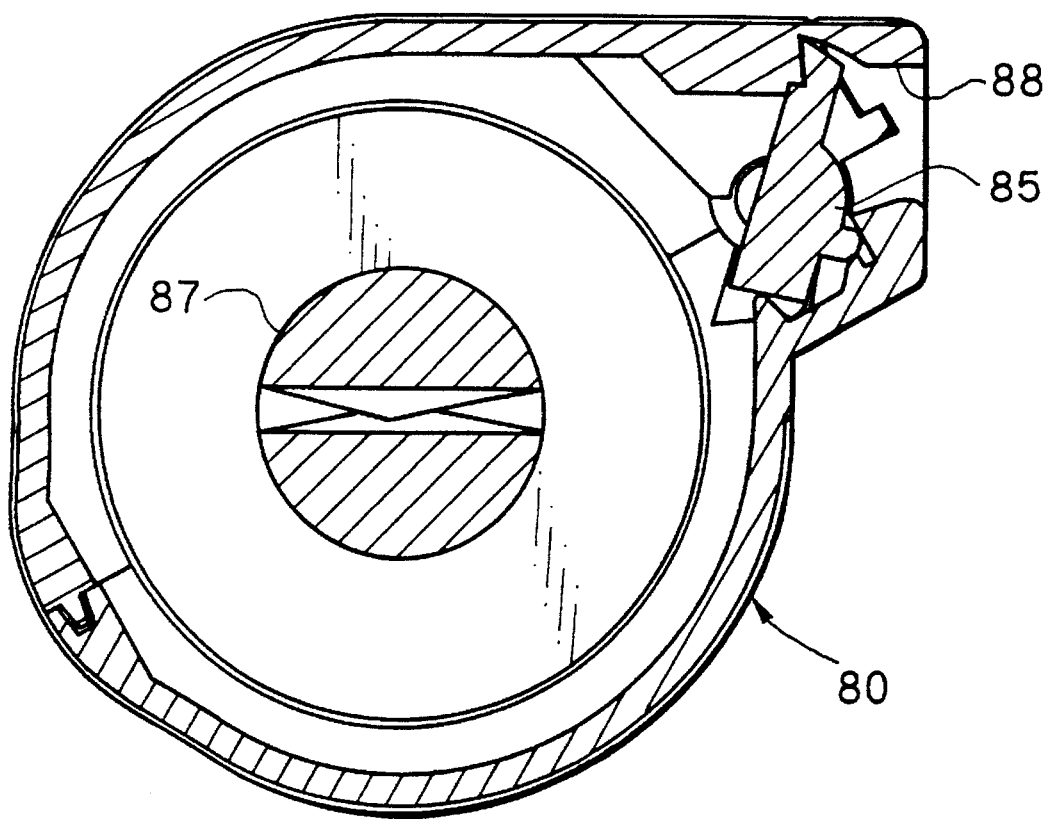
FIG. 24 is a cross section illustrating the cassette of FIG. 23, in which a shutter plate stands closed.
Figure 26:
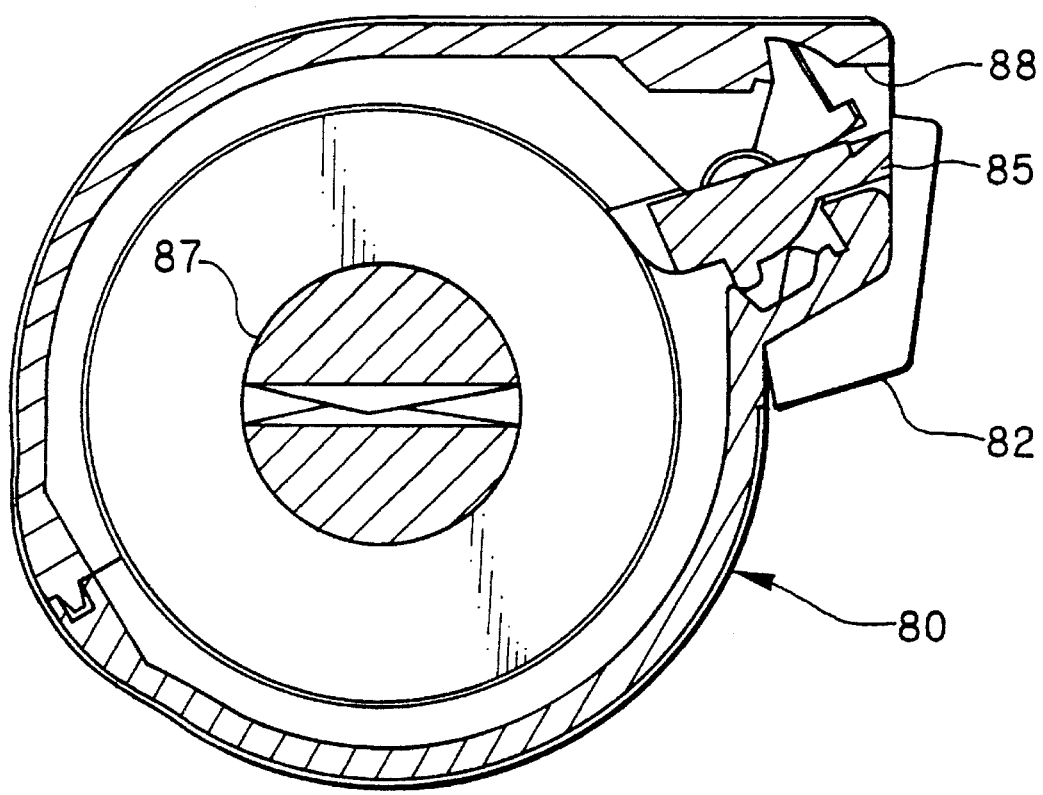
FIG. 26 is a cross section illustrating the cassette of FIG. 23, in which the shutter plate stands open.

FIG. 23 illustrates another preferred embodiment. A photographic film cassette 80 has a lever chamber 81. A locking lever 82 of the cassette 80 has a slot 83a which defines a deformable portion 83. The deformable portion 83 has a pin 83b. The slot 83a communicates with an opening 84, into which a pin 85a of a shutter plate 85 is inserted. The pin 83b, when the lever 82 is in the spool latching position, is inserted in an access hole 86a formed in a lower shell half 86. The shutter plate 85 is substituted for the former shutter rods, as illustrated in FIG. 24.

When the cassette 80 is loaded in a camera, a pin formed on a chamber door of the camera enters the hole 86. The deformable portion 83, with the pin 83b, is thus deformed resiliently and the pin 83b is disengaged to allow the spool 87 to be rotated by a drive shaft of the camera. The lever 82 thus swings to the unlatching position in FIG. 22. The shutter plate 85 is rotated counterclockwise to open a passage port 88. The remaining operation of this embodiment is similar to that of the first embodiment.

Figure 27:
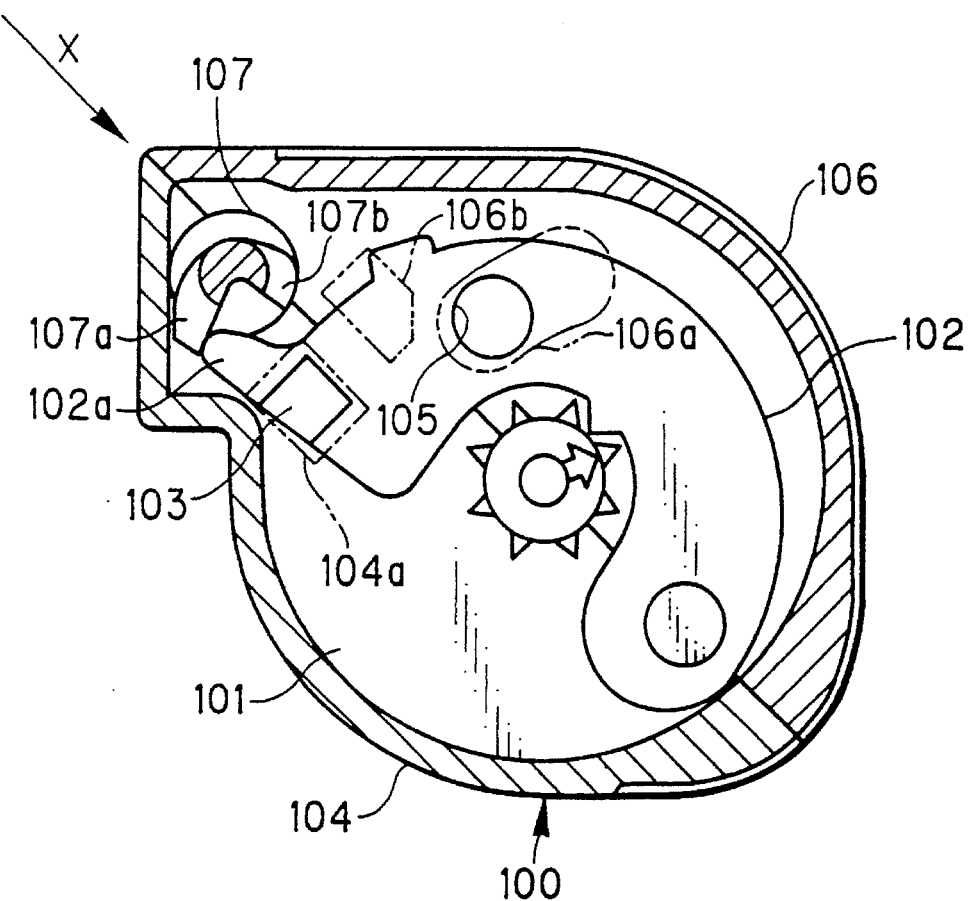
FIG. 27 is a cross section illustrating another preferred embodiment of a cassette, in which a spool is latched.
Figure 28:
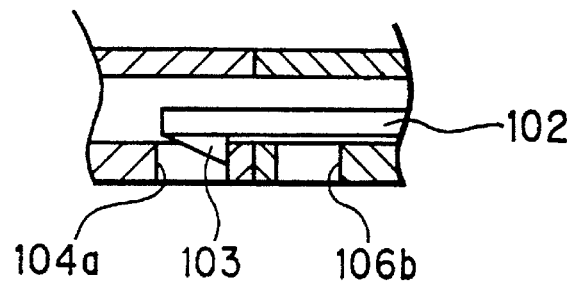
FIG. 28 is an explanatory view, in section, illustrating a locking lever as retained in the state of FIG. 27.

FIG. 27 illustrates another preferred embodiment. A photographic film cassette 100 has a lever chamber 101. A locking lever 102 of the cassette 100 has a hook 103. As viewed in section in FIG. 28 namely in the direction X, a hook 103 is retained on an edge of an access hole 104a formed in a lower shell half 104. In the lever 102 is formed an operable hole 105. An upper shell half 106 is provided with an elongated hole 106a, through which the operable hole 105 externally appears. A shutter rod 107 is provided with two operable portions 107a and 107b. A pressing portion 102a is formed on the lever 102, and stands in contact with the operable portion 107a to keep the shutter rod 107 in the closed position.

Figure 29:
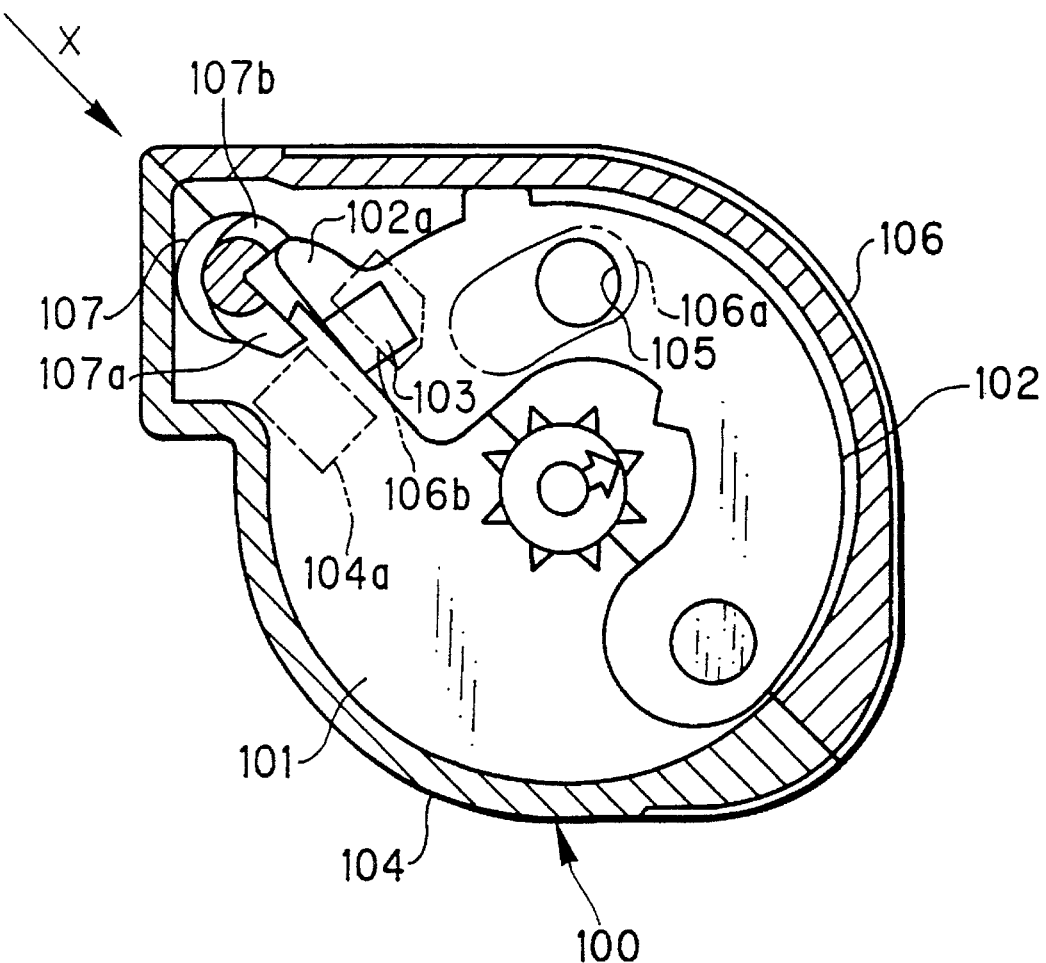
FIG. 29 is a cross section illustrating the cassette of FIG. 23, in which the spool is unlatched.
Figure 30:
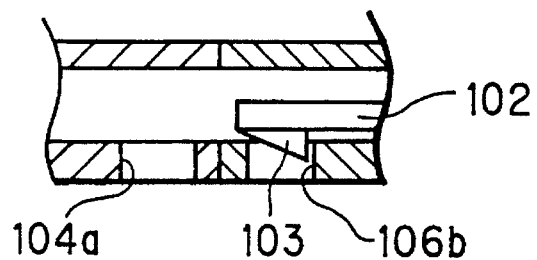
FIG. 30 is an explanatory view, in section, illustrating the lever as swung in the state of FIG. 29.
Figure 31:
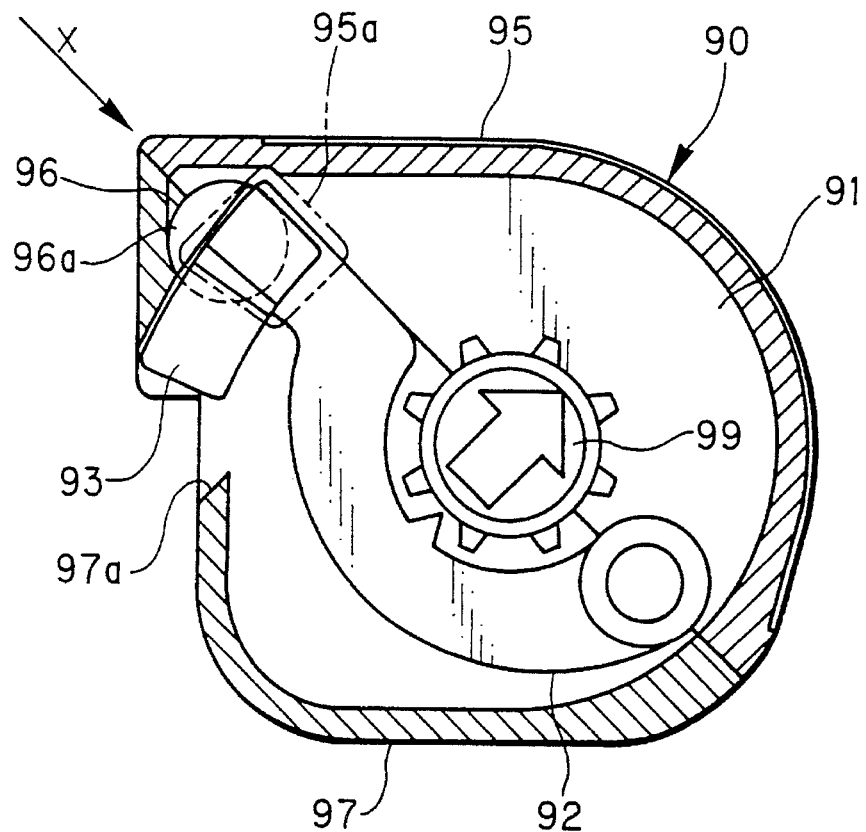
FIG. 31 is a cross section illustrating another preferred embodiment, in which a spool is latched.
Figure 34A:
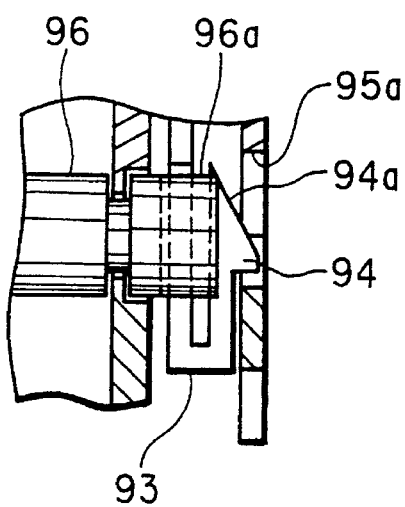
FIG. 34A is an explanatory view, in section, illustrating a locking lever as retained in the state of FIG. 31.

When the cassette 100 is loaded in a camera, an access pin formed on a chamber door of the camera enters the access hole 104a. The lever 102, with the hook 103, is thus deformed resiliently and the hook 103 is disengaged from the access hole 104a. The camera has a second shiftable pin, which is inserted into the elongated hole 106a, engaged with the operable hole 105 of the lever 102, and moved along the elongated hole 106a. The lever 102 is pressed clockwise in FIG. 27, and swings to the unlatching position in FIG. 29. The pressing portion 102a of the lever 102 abuts on the operable portion 107b, and presses the shutter rod 107 to the open position. The hook 103 is retained by an opening 106b formed in the upper shell half 106, in FIG. 30 as viewed in section namely in the direction X. The lever 102 is thereby prevented from movement. Note that, to return the lever 102 to the latching position, a third access pin of the camera enters the opening 106b and presses the hook 103, while the second shiftable pin swings the lever 102. The remaining operation is similar to that of the first embodiment.

FIGS. 31 to 34B illustrate another preferred embodiment. A photographic film cassette 90 has a lever chamber 91. A locking lever 92 of the cassette 90 has a deformable block 93, which has a U-shape as viewed in section in FIG. 33, namely in the direction X. The distal end of the deformable hook 93 is provided with a projection 94 having a slanted face 94a. The projection 94 is retained on an edge of an access hole 95a formed in an upper shell half 95. A shutter rod 96 has an axial end provided with a projection 96a shaped like a crescent. When the lever 92 is in the locking position, an upper face of the deformable hook 93 is in contact with the projection 96a, to regulate rotation of the shutter rod 96. The lever 92 also latches a spool 99.

Figure 32:
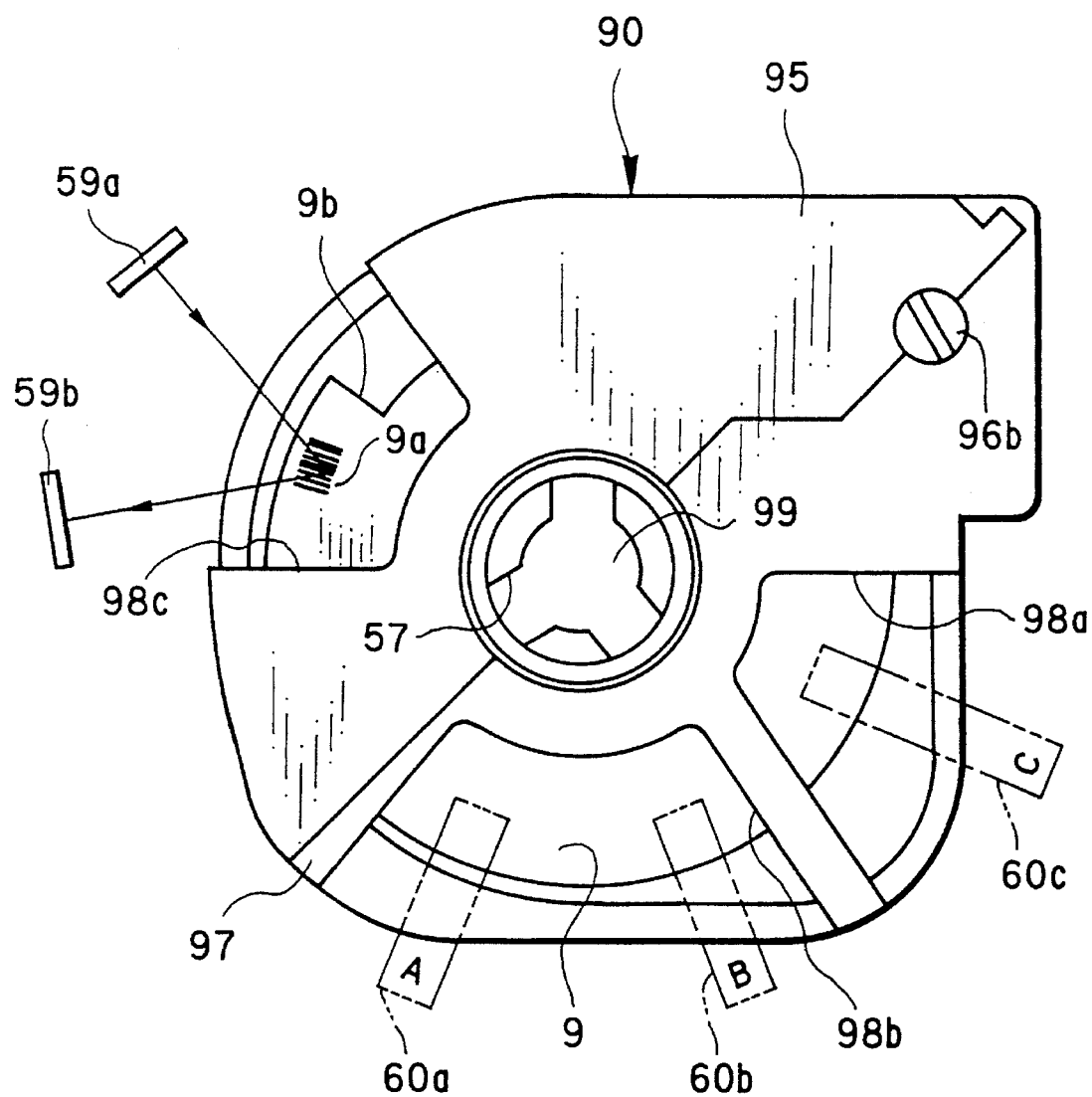
FIG. 32 is a side elevation illustrating the cassette of FIG. 31.
Figure 33:
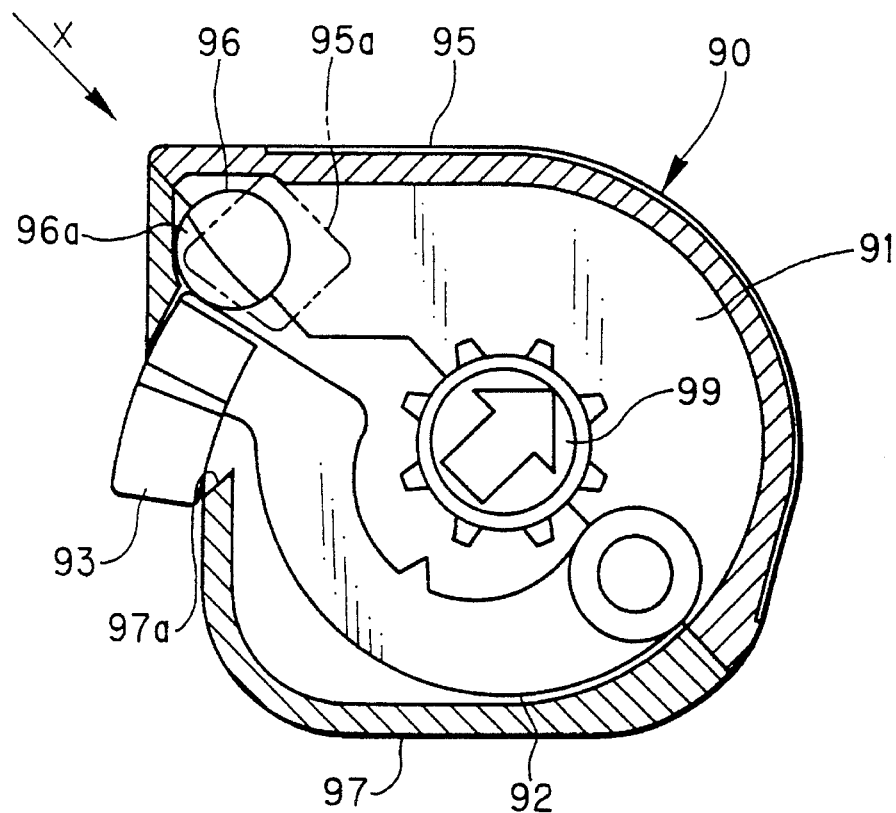
FIG. 33 is a cross section illustrating the cassette of FIG. 31, in which the spool is unlatched.
Figure 34B:
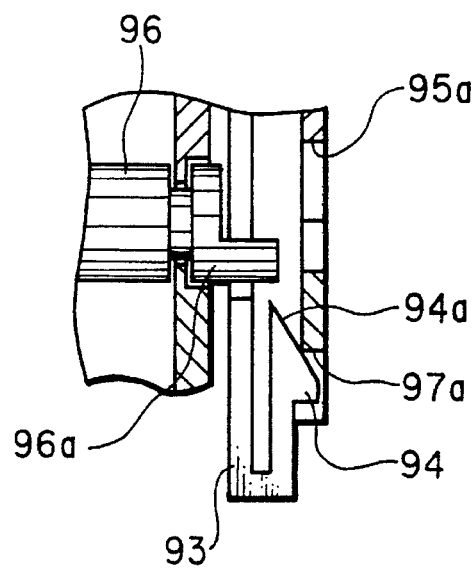
FIG. 34B is an explanatory view, in section, illustrating the lever as swung in the state of FIG. 33.

A pin is formed on a chamber door of the camera and has a slant opposite to the slated face 94a and with the same extent of inclination. When the cassette 90 is loaded into the camera, the pin enters the access hole 95a, and presses the slanted face 94a. The deformable hook 93 is thus resiliently deformed, and released from engagement with the access hole 95a. The lever 92 is forced toward the bottom of FIG. 34A due to the slanted face 94a, and displaced to an unlatching position in FIG. 34B. The deformable hook 93 comes out of a rotational path of the projection 96a to release the shutter rod 96, which is rotated by a mechanism of the camera via engagement of an operable portion 96b as illustrated in FIG. 32. At the same time the spool is unlatched and is allowed to rotate. The remaining operation is similar to that of the first embodiment. Note that an opening 98c is formed in an upper shell half 95 and openings 98a and 98b are formed in the lower shell half 97.

Figure 35:
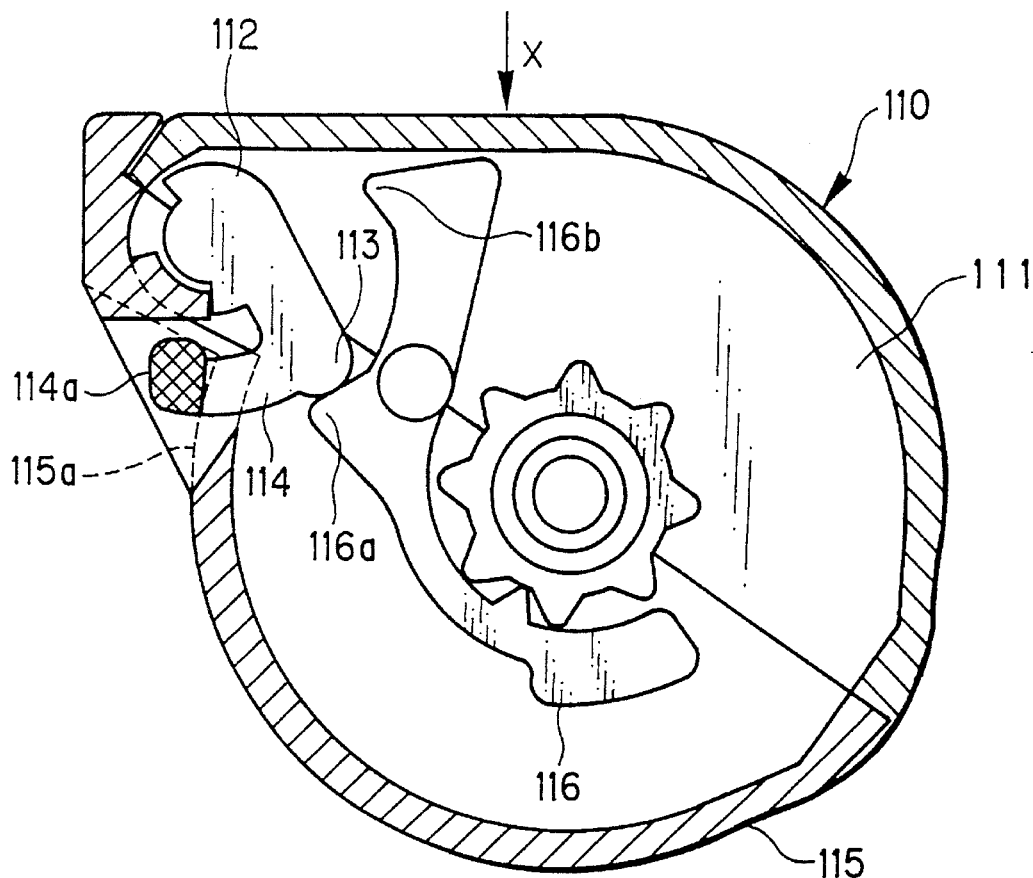
FIG. 35 is a cross section illustrating another preferred embodiment, in which a spool is latched.
Figure 36:
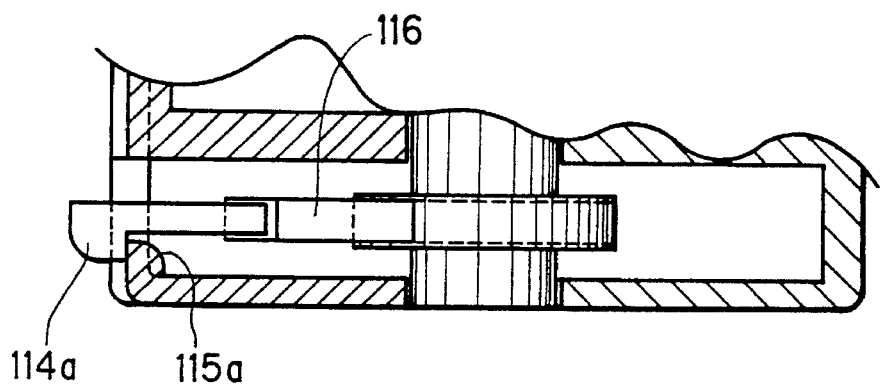
FIG. 36 is an explanatory view, in section, illustrating a shutter rod as retained in the state of FIG. 35.

FIG. 35 illustrates another preferred embodiment. A photographic film cassette 110 has a lever chamber 111. Unlike the former embodiments, a spool is latched and unlatched by operation of a shutter rod. A shutter rod 112 has a pressing portion 113, which has an arm 114. The distal end of the arm 114 is provided with a hook 114a, which, when standing in the latching position, is engaged with an opening 115a in a lower shell half 115 as illustrated in FIG. 36. The pressing portion 113 is in contact with an operable portion 116a formed on a lever 116.

Figure 37:
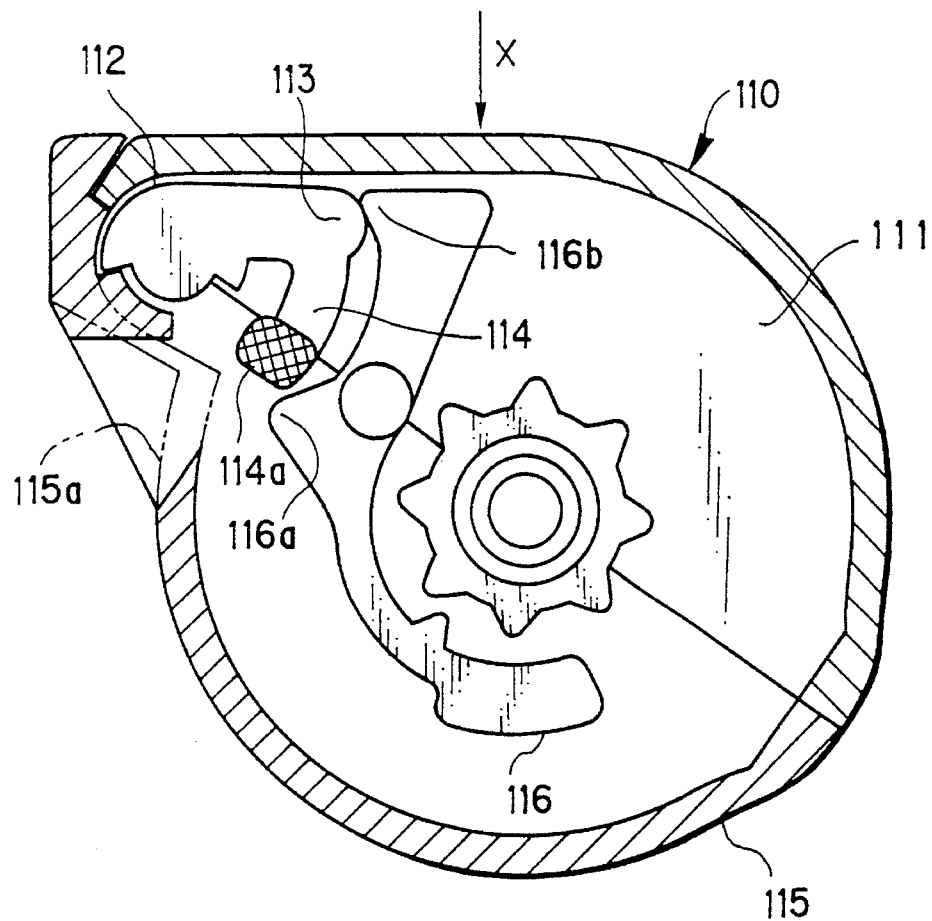
FIG. 37 is a cross section illustrating the cassette of FIG. 35, in which the spool is unlatched.
Figure 38:
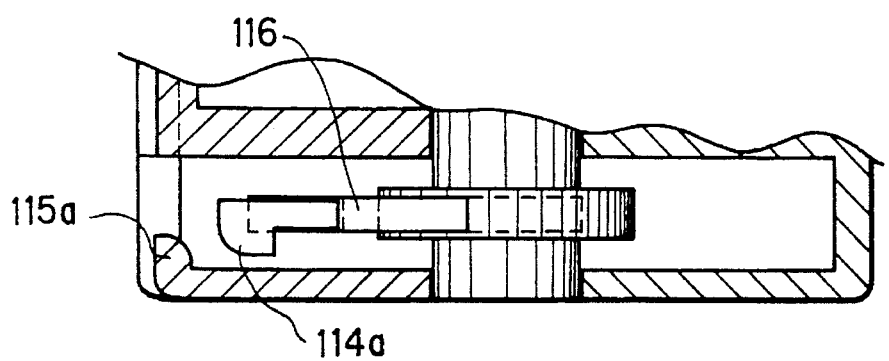
FIG. 38 is an explanatory view, in section, illustrating the shutter rod as rotated in the state of FIG. 37.

When the cassette 110 is loaded into a camera, a pin formed on a chamber door of the camera presses the hook 114a, deforms it resiliently, and releases it from retention with the opening 115a. A mechanism in the camera rotates the shutter rod 112 counterclockwise, until the pressing portion 113 is pressed against an operable portion 116b of the lever 116. The lever 116 is rotated clockwise and comes to unlatching positions in FIG. 37. While the shutter rod 112 is in the unlatching position, the hook 114a of the arm 114 is not retained as illustrated in FIG. 38. The shutter driving mechanism of the camera is fixedly engaged with the shutter rod, and prevents it from vibration. The remaining operation is similar to that of the first embodiment.

Figure 39:
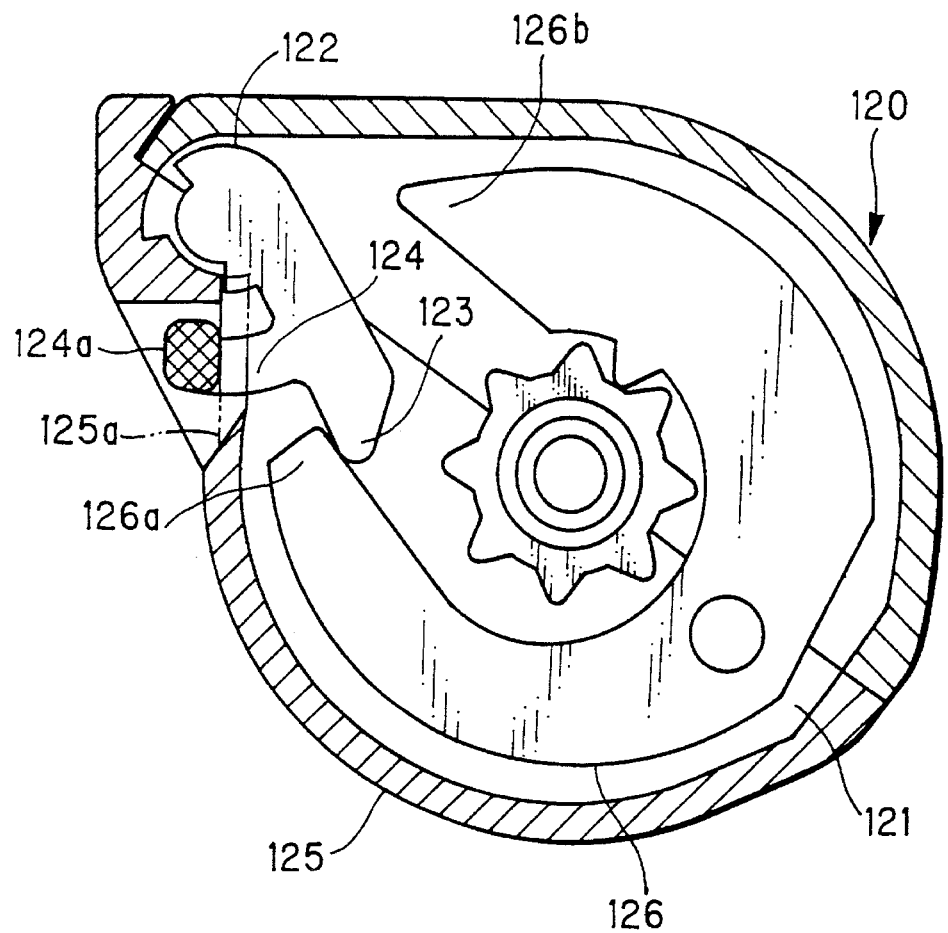
FIG. 39 to 42 are views corresponding to FIG. 35 to 38 respectively, but illustrating a yet another preferred embodiment.
Figure 40:
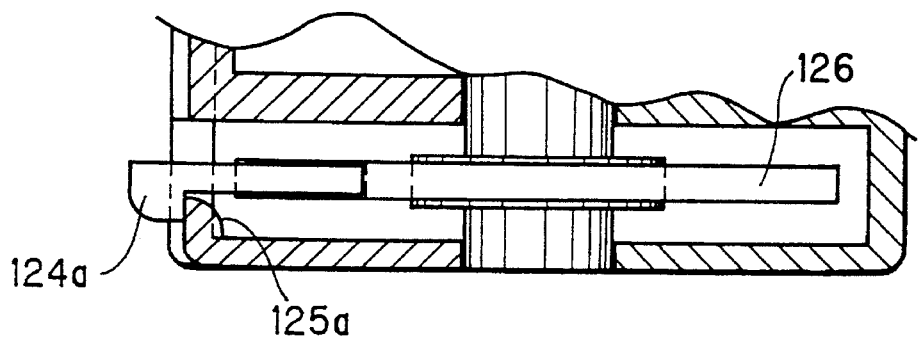

FIG. 39 illustrates another preferred embodiment. A photographic film cassette 120 has a lever chamber 121. Like the previous embodiment, a spool is latched and unlatched by operation of a shutter rod 122. The shutter rod 122 is provided with a pressing portion 123, which has an arm 124. The distal end of the arm 124 is provided with a hook 124a, which, when standing in the latching position, is engaged with an opening 125a in a lower shell half 125 as illustrated in FIG. 40. The pressing portion 123 is in contact with an operable portion 126a formed on a lever 126.

Figure 41:
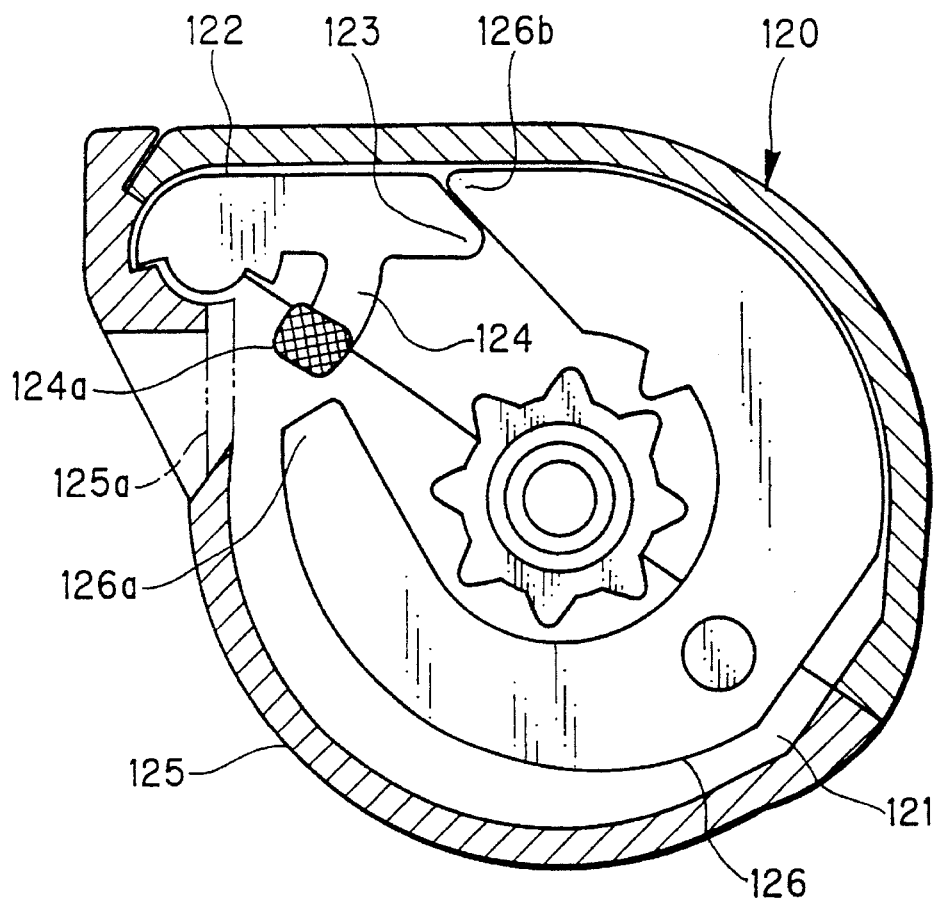
Figure 42:
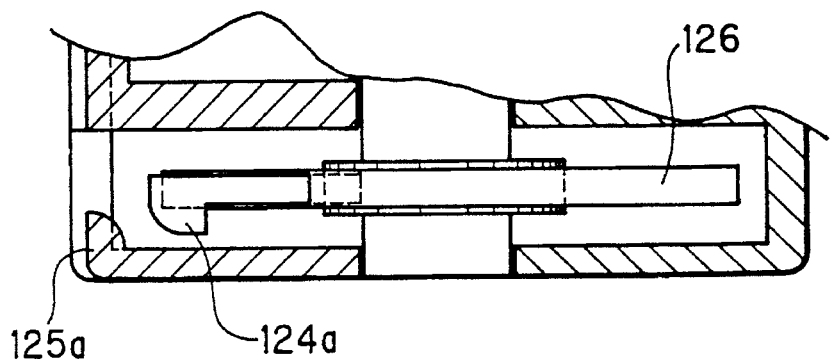
Figure 43:
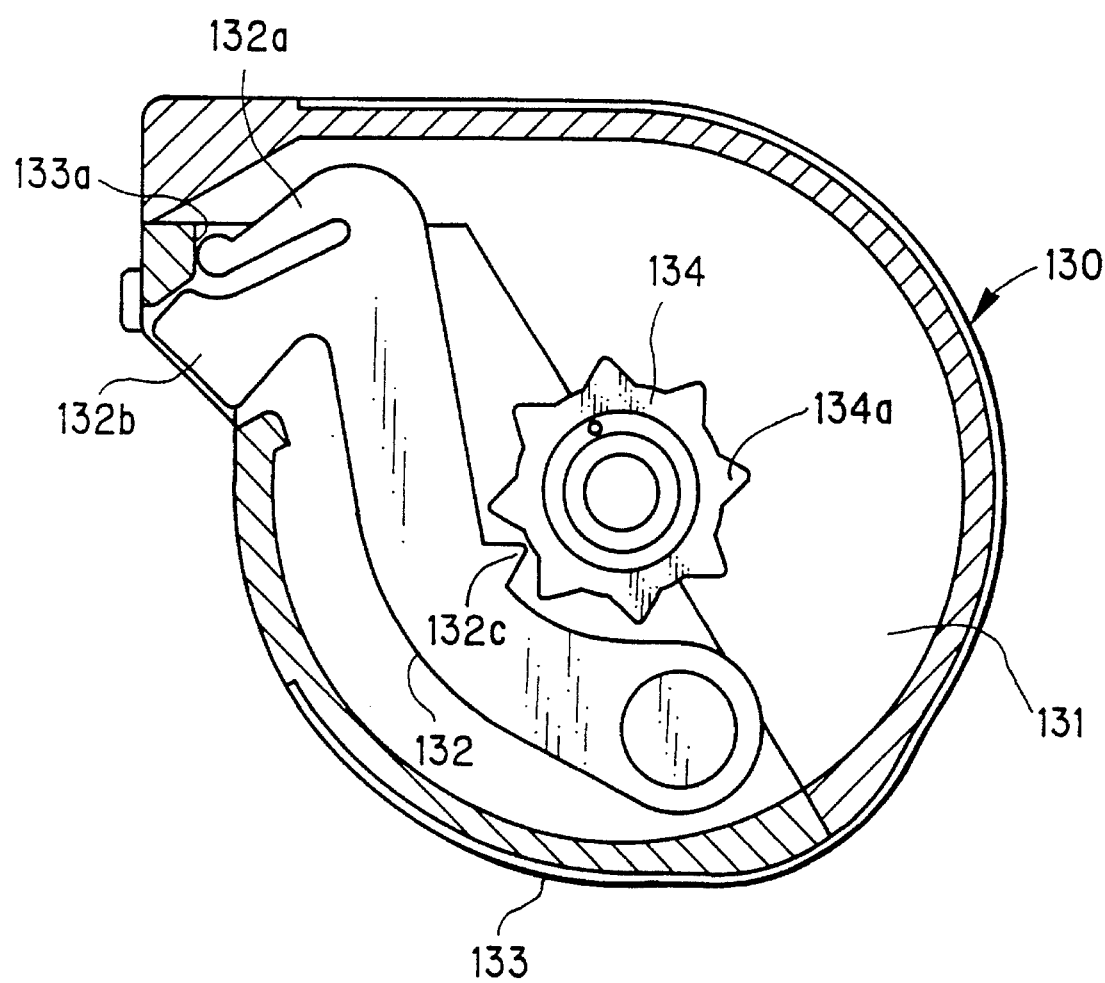
FIG. 43 is a cross section illustrating another preferred embodiment, in which a spool is latched.
Figure 44:
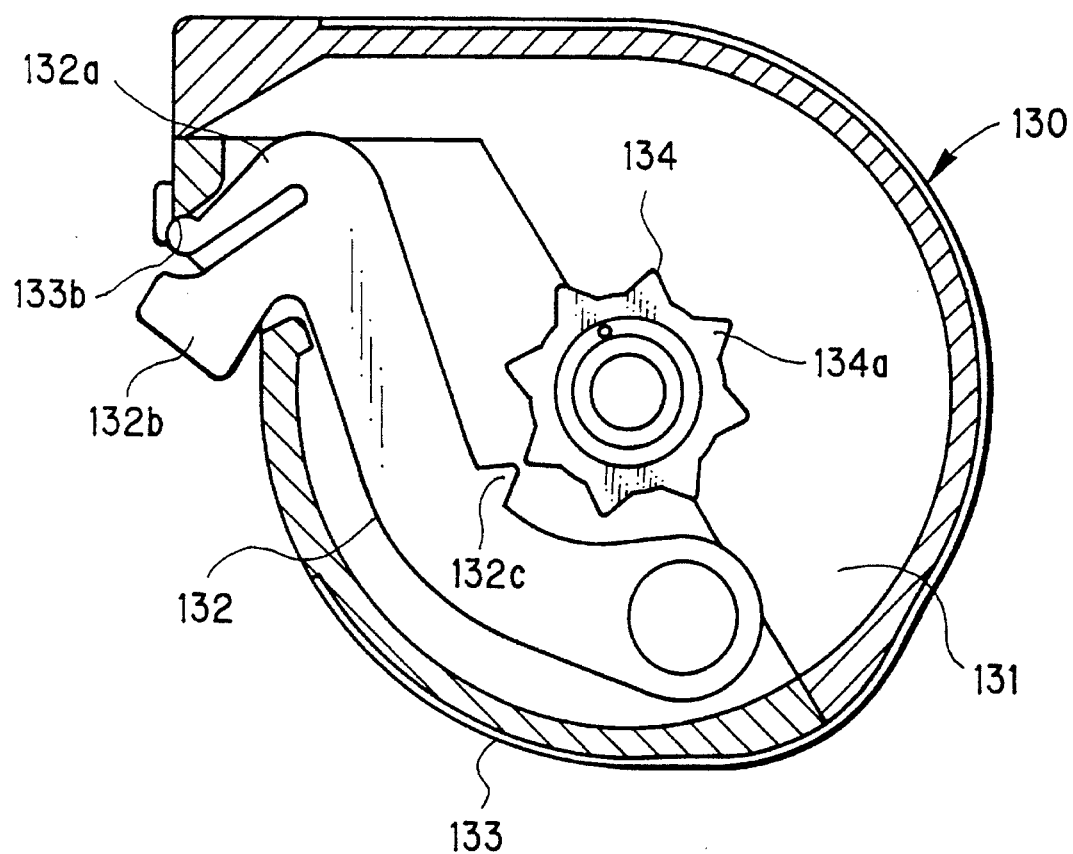
FIG. 44 is a cross section illustrating the cassette of FIG. 43, in which the spool is unlatched.

When the cassette 120 is loaded into a camera, a pin formed on a chamber door of the camera presses the hook 124a, and releases it from the opening 125a. The mechanism in the camera rotates the shutter rod 122, until the pressing portion 123 is pressed against an operable portion 126b. The lever 126 is rotated, and comes to unlatching position in FIG. 41. While the shutter rod 122 is in the unlatching position, the hook 124a is not retained as illustrated in FIG. 42 as viewed in section in the direction X (FIG. 41). The shutter driving mechanism of the camera is fixedly engaged with the shutter rod, and prevents it from vibration. The remaining operation is similar to that of the previous embodiment.

FIGS. 43 to 46 illustrate another preferred embodiment. A photographic film cassette 130 has a lever chamber 131. Unlike the former embodiments, the cassette 130 lacks a rotatable shutter member, and is shielded from light by a plush, sponge, or other light-trapping members 137a arranged inside a passage port 137. A locking lever 132 has a deformable hook 132, which is resiliently deformed by a mechanism of a camera. While the hook 132a abuts on a receiving face 133a of a lower shell half 133, the hook 132a locks a spool 134 by stopping the lever 132 from movement.

When the cassette 130 is loaded into the camera, the spool 134 is engaged with a drive shaft of the camera, and rotated in a direction of unwinding the photographic film 11. The spool 134 is rotated at a torque which would be somewhat greater than that required otherwise for advancing the photographic film 11, and causes a gear 134a to drive a claw 132c to swing the lever 132. The hook 132a is thus deformed resiliently, and is released from abutment on the receiving face 133a. Further rotation of the spool 134 moves the hook 132a and causes it to abut on a receiving face 133b of the lower shell half 133. The lever 132 is then in the spool unlatching position. To return the lever 132 to the latching position, a mechanism of the camera depresses an operable portion 132b of the lever 132.

Figure 45:
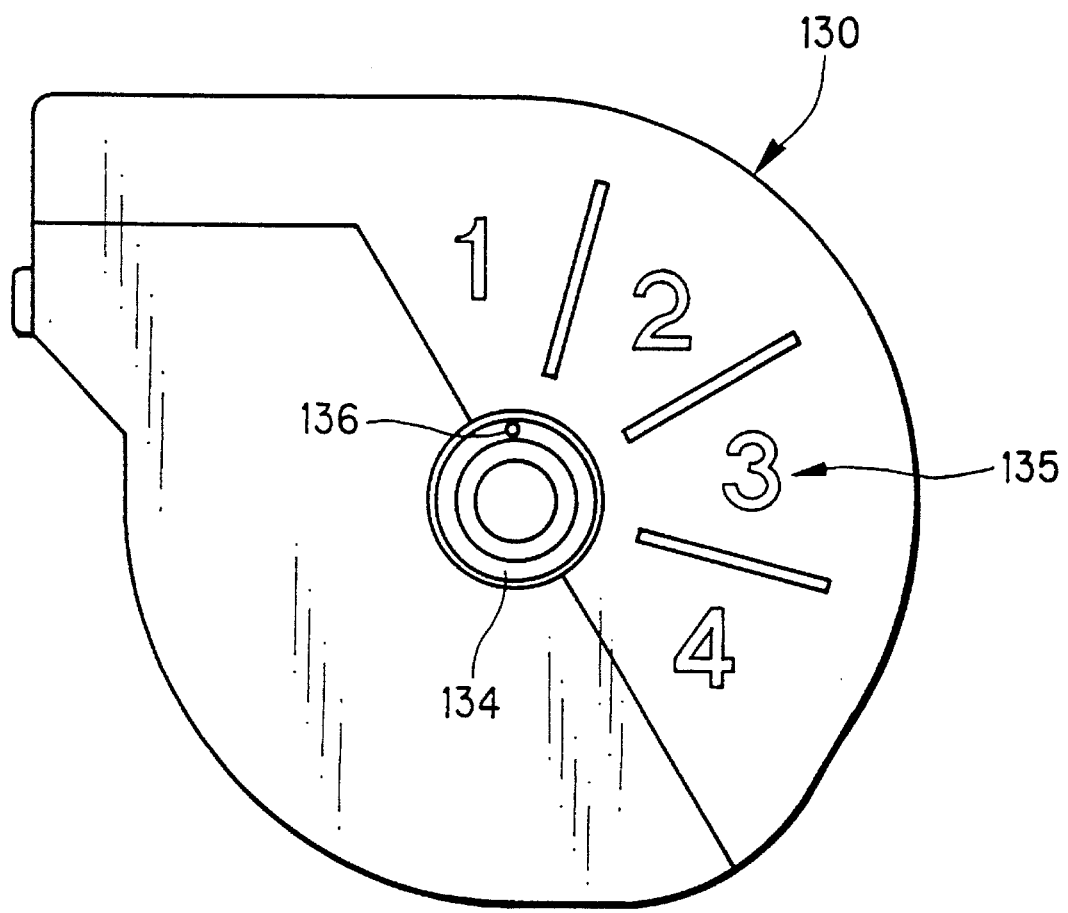
FIG. 45 is a side elevation illustrating the cassette of FIG. 43.

FIG. 45 illustrates an exposure status indication 135 divided into four indicative areas indicating numerical signs 1, 2, 3 and 4, which respectively indicate the Completely Unexposed State, the Partly Exposed State, the Completely Exposed State and the Developed State of the photographic film 11. A pointer 136 on the spool 134 is a round mark.

Figure 46:
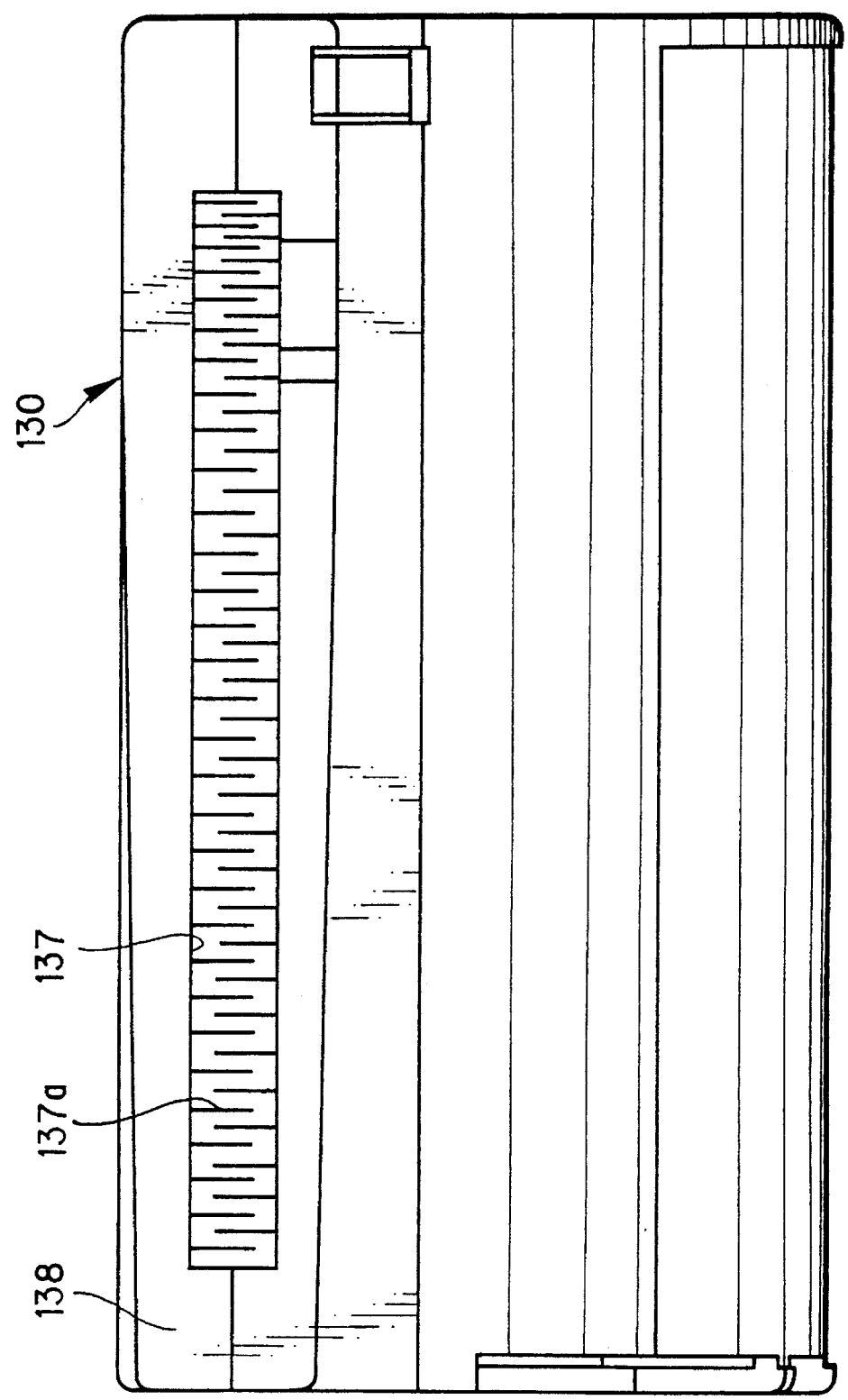
FIG. 46 is a front elevation of the cassette of FIG. 43.
Figure 47:
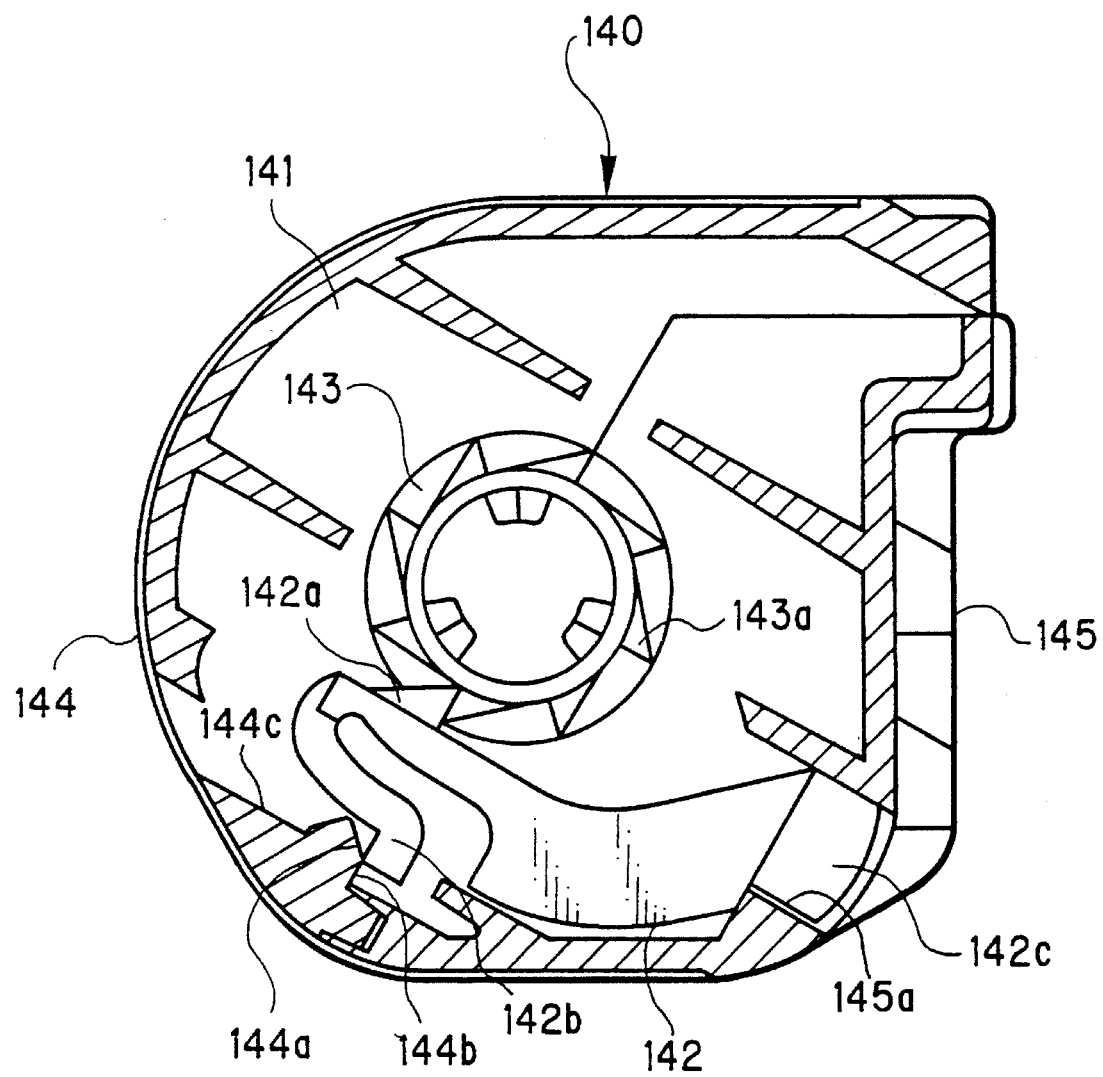
FIG. 47 is a cross section illustrating another preferred embodiment, in which a spool is latched.

FIG. 46 illustrates the passage port 137 of the cassette 130. A pair of port walls 138, between which the passage port 137 is defined are formed such that the thickness therein slightly decreases from the right to the left in FIG. 46. This shape is favorable in facility in loading the camera with the cassette by inserting the cassette upward through a bottom of the camera.

FIGS. 47–50 illustrate another embodiment. A photographic film cassette 140 has a slider chamber 141 for containing a locking slider 142. Like the previous embodiment, the cassette 140 is shielded from light by a plush, sponge or other light-trapping members 147a arranged inside a passage port 147. The cassette 140 of this embodiment lacks any signaling disk 9.

A locking slider 142 has a claw 142a for locking a spool 143, a hook 142b, and an outward projection 142c. The hook 142b, when the slider 142 is in the latching position, abuts on a receiving face 144b of a stopper 144a formed inside an upper shell half 144. The claw 142a is engaged with a gear 143a attached on the spool 143, and stops the spool 143 from rotating.

Figure 48:
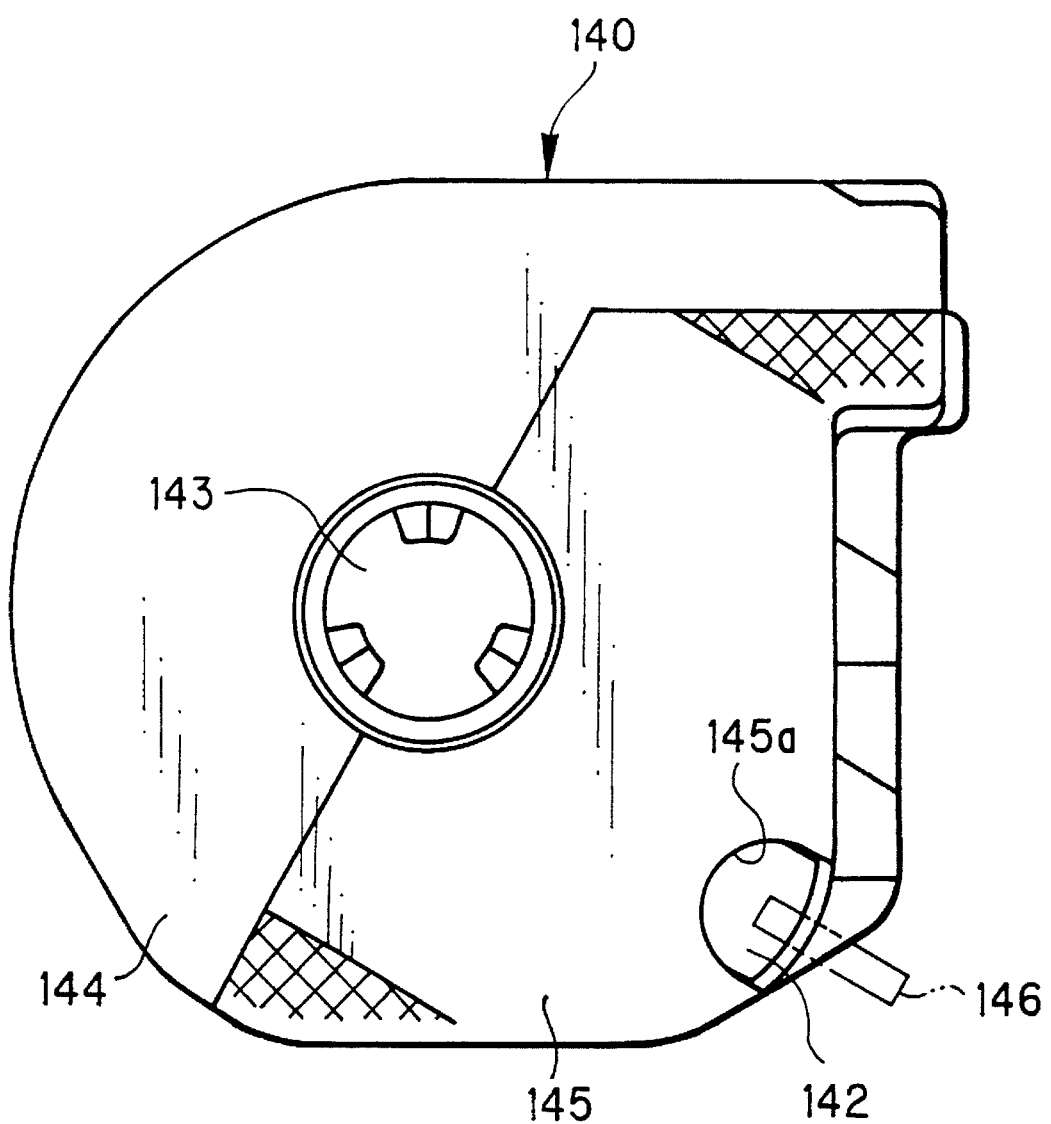
FIG. 48 is a side elevation illustrating the cassette of FIG. 47.
Figure 49:
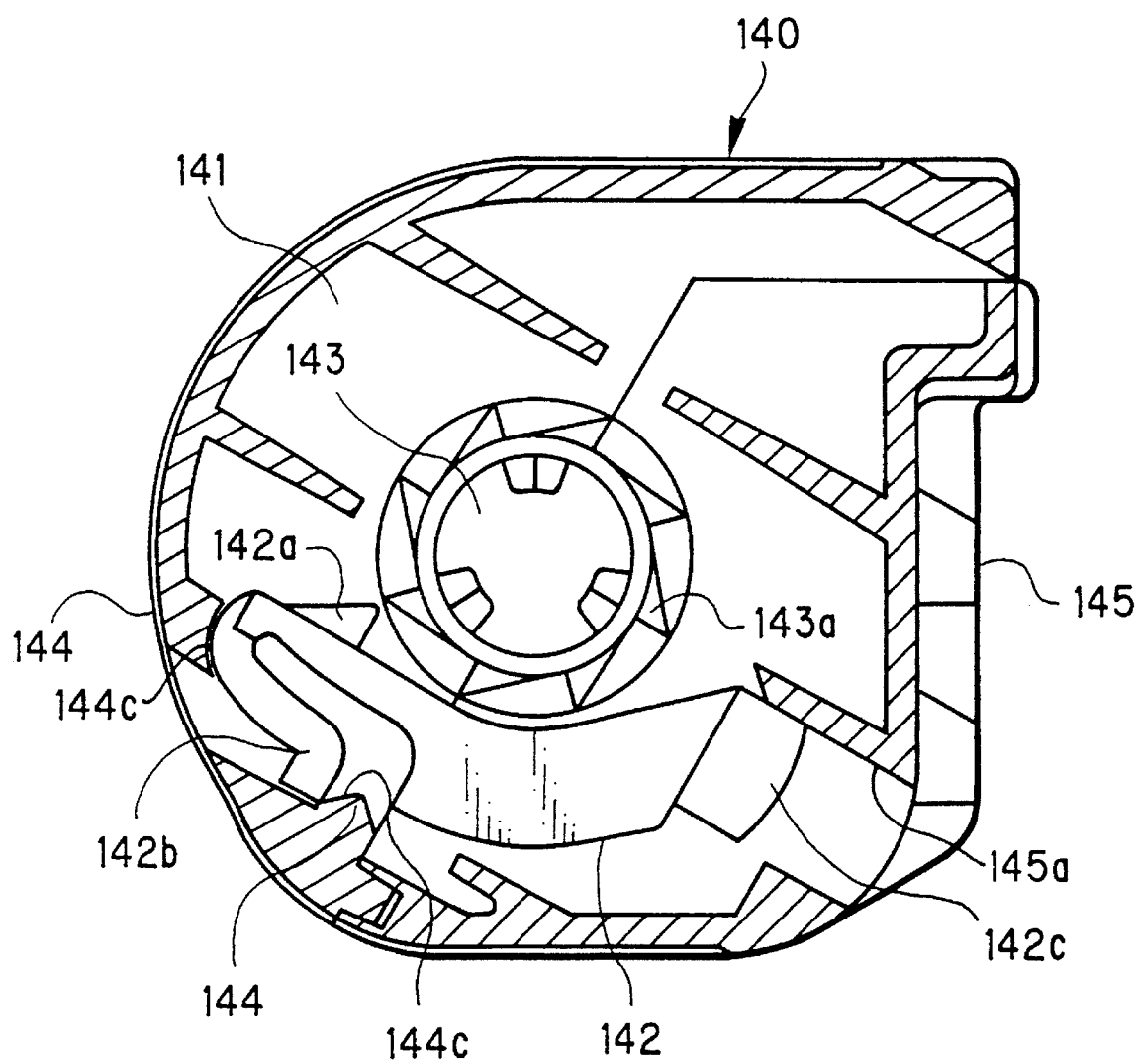
FIG. 49 is a cross section illustrating the cassette of FIG. 47, in which the spool is latched.

The cassette 140, as illustrated in FIG. 48, has a lower shell half 145 in which an opening 145a is formed. The projection 142c of the slider 142 is exposed to the outside through the opening 145a. The opening 145a, in fashion similar to the opening 58c in the first embodiment above in FIG. 14, is opposed to a contact sensor 146 of a camera when loaded with the cassette. The projection 142c is adapted to signaling the Unexposed State of the photographic film 11 when the projection 142c is detected as present in the opening 145a by the contact sensor 146.

When the cassette 140 is loaded into the camera, the spool 143 is engaged with a drive shaft, and rotated in a direction of unwinding the photographic film 11. The spool 143 is rotated at a torque which would be somewhat greater than that required otherwise for advancing the photographic film 11, and causes the gear 143a to drive the claw 142a. The hook 142b is thus resiliently deformed and forcibly rides upon the stopper 144a to come in contact with a receiving face 144c. The slider 142 then assume the spool unlatching position, in a manner where the slider will not be moved further. With the slider 142, the projection 142c is retracted into the inside of the lower shell half 145.

After exposure on the photographic film 11 is completed, the photographic film 11 is completely wound up into a cassette shell and the cassette 140 is unloaded from the camera. If the camera is loaded with the cassette 140 after exposure of the film 11, the contact sensor 146 detects absence of the projection 142c within the opening 145a. The camera then judges that the cassette 140 contains the exposed photographic film 11, and inhibits the photographic film 11 from use for photography. Accordingly, double exposure and other damage to the images on the photographic film will not occur. Note that a reference numeral 144c designates a through hole, through which the slider 142 is pressed. The through hole 144c is used only in the course of manufacture of the cassette 140, to slide the slider 142 to the latching position.

Figure 50:
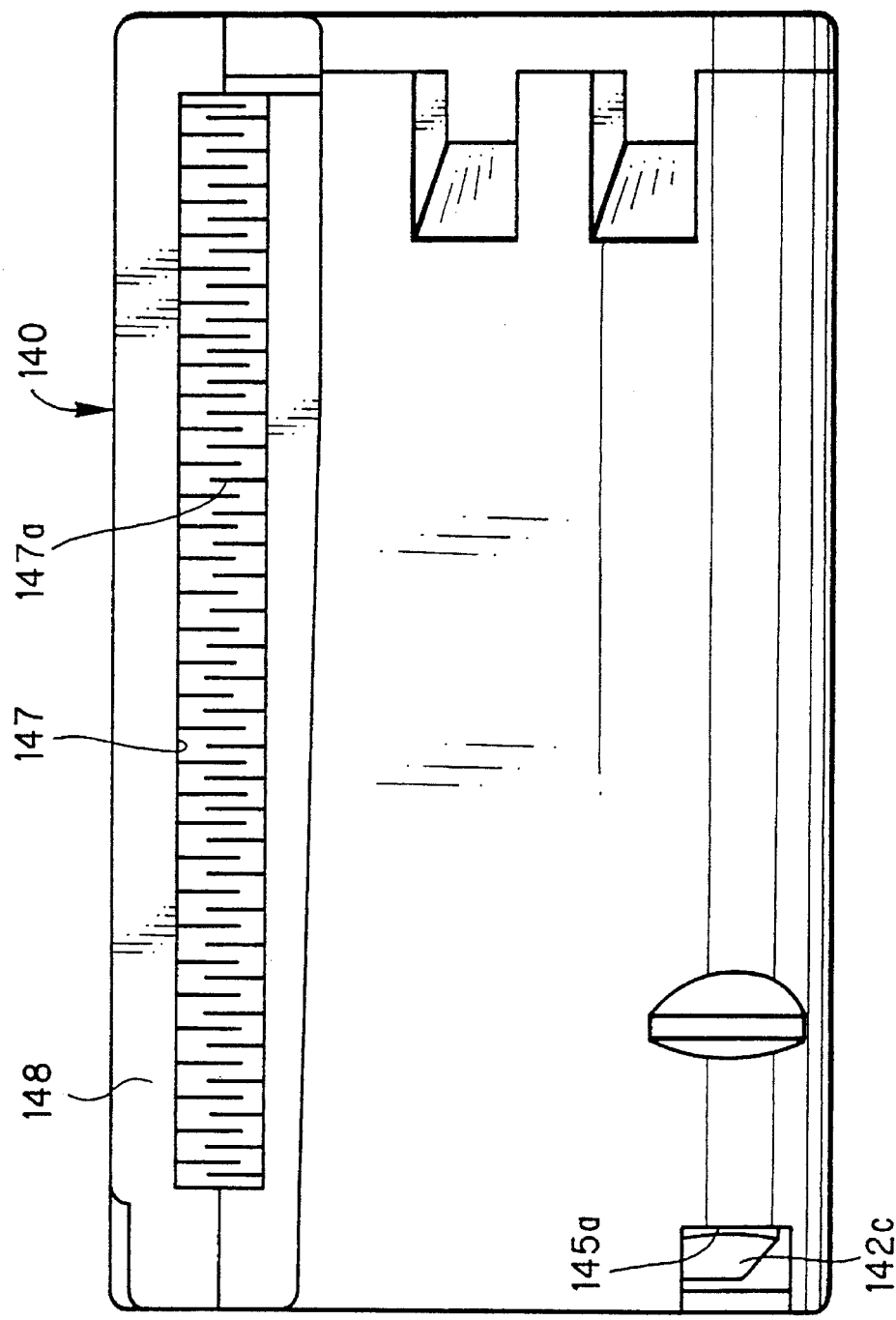
FIG. 50 is a front elevation of the cassette of FIG. 47.

FIG. 50 illustrates the passage port 147 of the cassette 140. A pair of port walls 148 defining the passage port 147 are formed such that the thickness thereof slightly decreases to the left in FIG. 50. This shape is favorable in facility in loading the camera with the cassette by inserting the cassette through a bottom of the camera. The remaining operation is similar to that of the former embodiments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette having a cassette shell provided with a roll chamber and a passage port for photographic film, and a spool on which said photographic film is wound and which is rotatably contained in a roll chamber, a leader of said photographic film being advanced outward through the passage port by rotation of said spool in an unwinding direction, comprising:

a shutter member movably arranged in said passage port to be displaced between closed and open positions, said shutter member, when assuming said closed position, blocks said passage port to prevent ambient light from entering into said roll chamber, and when assuming said open position, allowing said photographic film to pass through said passage port; and locking means for regulating displacement of said shutter member, said locking means being resiliently moveable between a locking position, where said shutter member is locked in said closed position, and an unlocking position, where said shutter member is moveable.

2. A photographic film cassette as defined in claim 1, wherein said cassette shell is constituted of two shell halves molded from resin, and joining edges of said shell halves, which extend along end faces of said cassette shell, are substantially straight.

3. A photographic film cassette as defined in claim 1, further comprising:

a pair of flanges formed on said spool for contacting first and second edges of said photographic film;

a pair of circumferential lips projecting from each of said flanges toward a respective opposite one of said flanges;

said leader having a distal end which is slanted so that said first edge extends beyond said second edge; and a notch formed in said leader in said first edge for preventing said circumferential lips from interfering with said first edge while said leader is advanced outward.

4. A photographic film cassette as defined in claim 1, further comprising:

a device arranged on a first end face of said cassette shell for indicating a status of exposure of said photographic film, said device comprising, a pointer member coupled to said spool and a plurality of indicative areas coupled to said cassette shell for being pointed to by said pointer member to indicate said status.

5. A photographic film cassette as defined in claim 4, further comprising:

latching means for selectively latching a rotational position of said spool relative to said cassette shell, said latching means latches said spool in a position so that said pointer member points to a selected one of said indicative areas.

6. A photographic film cassette as defined in claim 5, wherein a first indicative area, among said indicative areas, which indicates an unexposed state of said photographic film, has a smaller width than remaining ones of said indicative areas.

7. A photographic film cassette as defined in claim 4, further comprising:

a rotary plate arranged on said spool at an axial end thereof which is proximate a second end face opposite to said first end face of said cassette shell;

an opening formed in said cassette shell to allow said rotary plate to be exposed externally of said cassette shell; and a recess formed in said rotary plate to appear externally through said opening, a rotational position of said recess indicating said status of exposure of said photographic film.

8. A photographic film cassette as defined in claim 4, wherein said indicative areas comprise at least areas indicating an unexposed state of said photographic film, a partly exposed state of said photographic film, and a completely exposed state of said photographic film respectively, and said area corresponding to a completely exposed state is located apart from remaining ones of said areas.

9. A photographic film cassette as defined in claim 4, wherein said pointer member is arranged on said spool, and said indicative areas are arranged on said cassette shell.

10. A photographic film cassette as defined in claim 1, wherein said shutter member is a rod rotatably supported between said first and second shell halves, a slot is formed through said shutter rod to define a pair of walls in said shutter rod, and said walls block said passage port when assuming said closed position, and aligns said slot with said passage port when assuming said open position.

11. A photographic film cassette as defined in claim 1, wherein said shutter member is a plate, which obstructs said passageway when assuming said closed position, and extends along said passageway when assuming said open position.

12. A photographic film cassette as defined in claim 1, wherein said locking means is arranged on said shutter member.

13. A photographic film cassette as defined in claim 12, wherein said locking means is a retaining projection formed on said shutter member, and an opening is formed in said cassette shell, and said retaining projection is retained on an edge of said opening.

14. A photographic film cassette as defined in claim 13, further comprising a swingable lever for selectively latching said spool relative to said cassette shell, said lever, when driven by said shutter member, being displaced from a latching position where said spool is latched, to an unlatching position where said spool is allowed to rotate.

15. A photographic film cassette as defined in claim 14, further comprising:

a gear portion arranged on said spool; and a claw formed on said lever for latching said spool relative to said cassette shell by engagement with said gear portion, said claw, when said lever is driven by said shutter member, being disengaged from said gear portion.

16. A photographic film cassette as defined in claim 15, wherein a radius of a point of application, where said lever comes in contact with said spool to be driven by said spool, is larger than a radius of a point of operation, where said lever comes in contact with said shutter member to be driven.

17. A photographic film cassette as defined in claim 15, wherein a radius of a point of operation, where said lever comes in contact with said shutter member to be driven, is larger than a radius of a point of application, where said lever comes in contact with said spool to be driven by said spool.

18. A photographic film cassette as defined in claim 1, wherein said locking means is arranged on a swingable lever, which, when operated externally through said cassette shell, is displaced to said unlocking position.

19. A photographic film cassette as defined in claim 18, further comprising:

a gear portion arranged on said spool; and a claw formed on said lever for latching said spool relative to said cassette shell by engagement with said gear portion, said spool, after said lever is externally operated, being rotated, and said gear portion rotating and pressing said claw so as to displace said lever to said unlatching position.

20. A photographic film cassette as defined in claim 18, wherein said locking means is a projection formed on said lever, and an inside of said cassette shell has a retaining portion for retaining said projection in said locking position.

21. A photographic film cassette as defined in claim 20, further comprising:

a pointer member arranged on said spool; and a plurality of indicative areas arranged on said cassette shell for being pointed to by said pointer member to indicate a status of exposure of said photographic film, an indicative area, among said indicative areas, which corresponds to an unexposed state of said photographic film, having a smaller width than remaining ones of said indicative areas; and latching means for selectively latching said spool relative to said cassette shell, said latching means adapted to latching a rotational position of said spool so that said pointer member points to a selected one of said indicative areas.

22. A photographic film cassette as defined in claim 20, further comprising:

a rotary plate arranged on an axial end of said spool to appear on an end face of said cassette shell;

a pointer member arranged on said rotary plate;

a plurality of indicative areas arranged on said cassette shell for being pointed to by said pointer member to indicate a status of exposure of said photographic film; and latching means for selectively latching said spool relative to said cassette shell, said latching means adapted to maintaining a rotational position of said spool so that said pointer member points to a selected one of said indicative areas.

23. A photographic film cassette as defined in claim 22, wherein said rotary plate is formed integrally with said spool.

24. A photographic film cassette as defined in claim 22, wherein said rotary plate is attached to said spool.

25. A photographic film cassette as defined in claim 18, further comprising:

a through hole formed through an end face of said cassette shell; and a projected portion formed on said lever in correspondence with said through hole, said lever, when inserted into said through hole, being retained in said locking position, and when pressed by an external operation, being moved to said unlocking position.

26. A photographic film cassette as defined in claim 25, further comprising:

an externally operable portion formed on said shutter member and exposed to an outside of said cassette shell to be operated while said lever stands in said unlocking position, to displace said shutter member to said open position.

27. A photographic film cassette as defined in claim 26, wherein said projected portion formed on said lever has a slanted face to be pressed by an external device.

28. A photographic film cassette as defined in claim 25, wherein said shutter member is driven by said lever.

29. A photographic film cassette as defined in claim 28, wherein:

a second through hole is formed through said end face of said cassette shell; and a third hole is formed in said lever to be accessed through said second through hole by an external device, an edge of said third hole being rotated so as to displace said lever.

30. A photographic film cassette as defined in claim 28, further comprising:

opener means for displacing said shutter member to said open position when said spool is rotated.

31. A photographic film cassette as defined in claim 30, wherein said opener means comprises:

a gear portion arranged on said spool; and a claw formed on said lever for being engaged with said gear portion, said spool, after said lever is externally operated, being rotated, and said gear portion rotating and pressing said claw so as to displace said lever to said unlocking position.

32. A photographic film cassette as defined in claim 31, wherein said shutter member, when displaced to said open position, is rotated in reverse to said unwinding direction of said spool.

33. A photographic film cassette as defined in claim 31, wherein said shutter member, when displaced to said open position, is rotated in a direction same as said unwinding direction of said spool.

34. A photographic film cassette having a cassette shell provided with a roll chamber and a passage port for photographic film, and a spool on which said photographic film is wound and which is rotatably contained in a roll chamber, and in which a leader of said photographic film is advanced outward through a passage port by rotation of said spool in an unwinding direction, comprising:

a shutter member arranged in said passage port to be displaced between closed and open positions, said shutter member, when assuming said closed position, blocking said passage port to prevent ambient light from entering said roll chamber, and when assuming said open position, allowing said photographic film to pass by opening said passage port; and opener means for displacing said shutter member to said open position in response to rotation of said spool.

35. A photographic film cassette having a cassette shell defining a chamber and a passage port, a spool having photographic film wound thereon being disposed in said cassette shell, said cassette comprising:

a shutter member movably disposed in said passage port and being movable between a closed position, in which said shutter member blocks said passage port, and an open position, in which said shutter member allows said film to pass through said passage port;

a lever pivotally supported in said cassette shell about a fulcrum point, said lever being engaged with said shutter member at an end of said lever that is remote from said fulcrum point, said lever being pivotable between a first position in which said lever pushes said shutter member into the closed position and a second position in which said lever pushes said shutter member into said open position;

a gear portion arranged on said spool;

a claw formed on a central portion of said lever, said claw being engaged with said gear portion to prevent rotation of said spool when said lever is in said first position and said claw being removed from said gear portion to allow rotation of said spool when said lever is in said second position.

36. A photographic film cassette having a cassette shell defining a chamber and a passage port, a spool having photographic film wound thereon being disposed in said cassette shell, said cassette comprising:

a shutter member movably disposed in said passage port and being movable between a closed position, in which said shutter member blocks said passage port, and an open position, in which said shutter member allows said film to pass through said passage port;

a lever pivotally supported in said cassette shell about a fulcrum point, said lever being engaged with said shutter member at an end of said lever that is remote from said fulcrum point, said lever being pivotable between a first position in which said lever pushes said shutter member into the closed position and a second position in which said lever pushes said shutter member into said open position;

a resilient hook formed on said lever, said hook being engageable with a portion of said cassette shell when said lever is in said first position to prevent said lever from being moved to said second position.

37. A photographic film cassette as recited in claim 36, further comprising:

a gear portion arranged on said spool;

a claw formed on a central portion of said lever, said claw being engaged with said gear portion to prevent rotation of said spool when said lever is in said first position and said claw being removed from said gear portion to allow rotation when said lever is in said second position.

* * * * *